US012241284B2

(12) United States Patent
Zhang et al.

(10) Patent No.: US 12,241,284 B2
(45) Date of Patent: Mar. 4, 2025

(54) ELECTROMECHANICAL MULTI-DIRECTIONAL LOCK

(71) Applicant: Digilock Asia Ltd., Kowloon (HK)

(72) Inventors: An Zhang, Shaoguan (CN); Asil Gokcebay, Petaluma, CA (US)

(73) Assignee: Security People, Inc., Houston, TX (US)

( * ) Notice: Subject to any disclaimer, the term of this patent is extended or adjusted under 35 U.S.C. 154(b) by 0 days.

(21) Appl. No.: 18/228,584

(22) Filed: Jul. 31, 2023

(65) Prior Publication Data

US 2023/0374821 A1 Nov. 23, 2023

Related U.S. Application Data

(63) Continuation of application No. 16/927,831, filed on Jul. 13, 2020, now Pat. No. 11,713,596, which is a continuation of application No. 16/677,564, filed on Nov. 7, 2019, now Pat. No. 10,697,203, which is a continuation-in-part of application No. 16/426,302, filed on May 30, 2019, now Pat. No. 10,711,489.

(51) Int. Cl.

| | |
|---|---|
| ***E05B 63/06*** | (2006.01) |
| ***E05B 9/02*** | (2006.01) |
| ***E05B 17/10*** | (2006.01) |
| ***E05B 63/00*** | (2006.01) |
| ***E05B 65/02*** | (2006.01) |
| ***G07C 9/00*** | (2020.01) |
| *E05B 47/00* | (2006.01) |
| *E05B 63/04* | (2006.01) |
| *E05B 65/46* | (2017.01) |

(52) U.S. Cl.

CPC ............ *E05B 63/0056* (2013.01); *E05B 9/02* (2013.01); *E05B 17/10* (2013.01); *E05B 63/06* (2013.01); *E05B 65/025* (2013.01); *G07C 9/00309* (2013.01); *E05B 47/0012* (2013.01); *E05B 2047/0048* (2013.01); *E05B 2047/0058* (2013.01); *E05B 2047/0069* (2013.01); *E05B 63/04* (2013.01); *E05B 65/46* (2013.01); *E05Y 2900/20* (2013.01); *G07C 2009/00325* (2013.01)

(58) Field of Classification Search

CPC ........ E05B 63/0056; E05B 9/02; E05B 17/00; E05B 17/10; E05B 63/06; E05B 65/025; E05B 47/0012; E05B 63/04; E05B 65/46; E05B 2047/0048; E05B 2047/0058; E05B 2047/0069; E05Y 2900/20; G07C 9/00309; G07C 2009/00325; E05C 1/06; Y10T 70/5681; Y10T 70/7051; Y10T 70/7062; Y10T 292/1018; Y10T 292/1097

USPC ............ 70/266, 461, 277–285; 292/144, 244

See application file for complete search history.

(56) References Cited

U.S. PATENT DOCUMENTS

| | | | | |
|---|---|---|---|---|
| 7,455,335 B2 * | 11/2008 | Garneau | E05C 1/12 292/144 |
| 10,697,203 B1 * | 6/2020 | Gokcebay | E05B 63/0056 |
| 10,711,489 B1 * | 7/2020 | Zhang | E05B 63/04 |

(Continued)

*Primary Examiner* — Suzanne L Barrett

(57) ABSTRACT

An electromechanical lock includes a main housing and a lock housing. The lock housing includes a locking element such as a bolt or a latch that can be translated between a locked position and an unlocked position by an actuator. The lock housing can be mounted to the main housing in more than one orientation.

16 Claims, 49 Drawing Sheets

(56) References Cited

U.S. PATENT DOCUMENTS 11,713,596 B2 * 8/2023 Zhang .................. E05B 65/025
70/277

* cited by examiner

ELECTROMECHANICAL MULTI-DIRECTIONAL LOCK

CROSS REFERENCE TO RELATED APPLICATIONS

This application is a continuation of, and claims priority to, U.S. application Ser. No. 16/927,831, now U.S. Pat. No. 11,713,596, which is a continuation of and claims priority to U.S. application Ser. No. 16/677,564, now U.S. Pat. No. 10,697,203, which is a continuation-in-part of, and claims priority to, U.S. application Ser. No. 16/426,302, filed on May 30, 2019, now U.S. Pat. No. 10,711,489.

FIELD OF THE DISCLOSURE

The present disclosure relates generally to self-contained locks that are mounted on the interior side of doors or panels of cabinets, lockers, and other furniture. In particular, the present disclosure relates to a lock that mounts to the back side of a door or panel and includes a user interface that extends forwardly through a hole in the door. The backset of the user interface relative to the lock may be adjustable.

BACKGROUND

Locking devices for cabinets, drawers, access panels, lockers, and other furniture items can take many forms. In one example, a dead bolt lock is attached to a door or other access panel. When the door or panel is closed, a user can turn a knob or key, and the dead bolt will extend out from a lock housing into a strike plate or behind the door frame to lock the door closed. The user can turn the knob or key back to the original position, and the dead bolt will retract back into its housing, thereby unlocking the door and allowing the user to open it.

In another example, a push-to-close latch is similarly attached to a door or panel and has a latch with a ramp end. The latch is spring-biased to a locked position and extends outwardly from the housing. As the user closes the door, the latch contacts the strike plate. The strike plate then forces the latch inward against the spring force as the door continues to close. After the latch clears the strike plate, the spring forces the latch to its extended position behind the door frame and the door becomes locked. To open the door or panel, the user can, for example, turn a key or rotate a handle to retract the latch back into the housing.

In a third example, locks known as cam locks can be used to lock a door or panel closed. The construction of mechanical cam locks are well known in the art. See, e.g., U.S. Pat. No. 9,512,653, at 1:28-37: “Cam locks correspond to a relatively well known lock type that finds many uses in securing enclosures including for example, but not limited to, cabinets, drawers, and desks. Typically, in cam lock applications, the cam, upon rotation, contacts the inside of an associated enclosure frame or a strike fitted to such frame.” Cam locks typically include a cylinder that is disposed in a complementary opening in the door or panel.

In all three of these examples, the lock structure is typically hidden behind or in the door, and the only element visible to the user is the knob or key slot. In other words, there is no indication to the user as to the lock’s status. It would be desirable for locks such as the above to include a user interface extending through the door that includes an indicator to quickly and efficiently inform the user whether the lock was locked or unlocked. Further, for an electronic lock, it would be desirable for that user interface to either alternatively or additionally provide a connector for an electronic key that can, for example, open the lock, program the lock, provide power to the lock, or any combination of functions.

Moreover, many furniture items are sold with basic mechanical cam locks. In some instances, it may be desirable to be replace those cam locks with electronic locks disposed behind the door panel. It would be desirable for the user interface to be sized and shaped to be inserted into the cylindrical hole left behind by the removed mechanical cam lock. Cam locks, however, may be placed on the door panel with varying backsets—the distance from the cylindrical hole to the edge of the door. It would be desirable for the user interface to be laterally adjustable to accommodate the varying backsets of mechanical cam locks.

DETAILED DESCRIPTION

Figure 1:
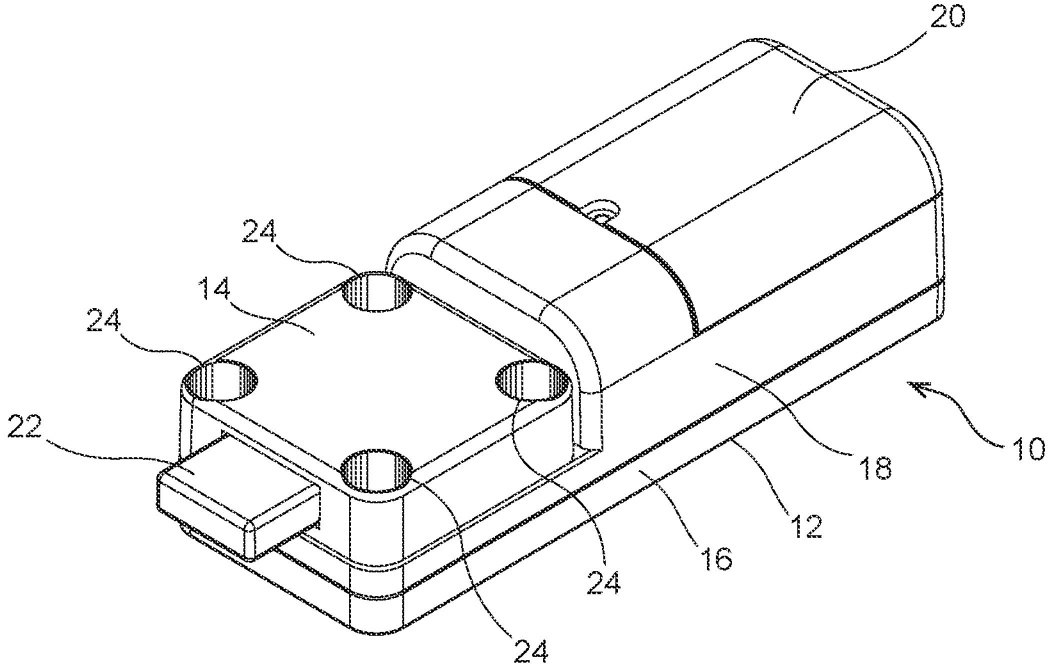
FIG. 1 is a perspective view of a first example of a lock including a lock housing and main housing.

FIG. 1 depicts an electromechanical lock 10 with a main housing 12 and a lock housing 14. The main housing 12 has a base 16, a motor and gearbox casing 18, and a battery cover 20. A locking element 22 operates linearly within the lock housing 14. In this example, the locking element 22 is a bolt 22. The lock housing 14 includes four mounting holes 24 that are used, as will be seen, to both affix the lock 10 to a furniture item or panel and to affix the lock housing 14 to the main housing 12.

Figure 2:
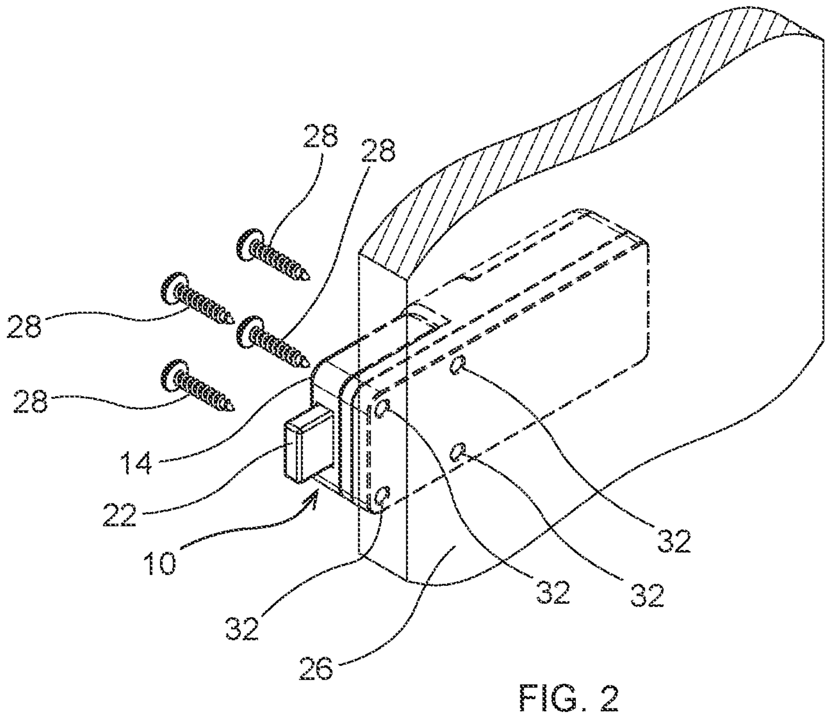
FIG. 2 is a perspective view of the lock of FIG. 1 mounted to a cabinet door.

Referring now to FIG. 2, the lock 10 is shown installed on a wood door 26. The lock 10 can be installed on cabinets, doors, drawers, panels, cases, lockers, or other similar furniture or storage device. Four wood screws 28 extend through the mounting holes 24 of the lock housing 14, through a set of coaxial holes 30 in the casing 18 (shown best in FIG. 3), through a further set of coaxial through holes 32 in the base 16, and into the door 26 to affix the lock 10 to the door 26. The mounting holes 24 of the lock housing 14 can be countersunk. The bolt 22 of the lock 10 as shown in FIG. 2 is extended out from the lock housing 14, which is defined as the "locked position." As is known in the art, the bolt 22 can extend either behind a door frame or into a strike plate (not shown) affixed to the door frame to secure the door 26 relative to the door frame. As is further known, the bolt 22 can retract into the lock housing 14, defined as the "unlocked position," to allow the door 26 to open and close relative to the door frame.

Figure 3:
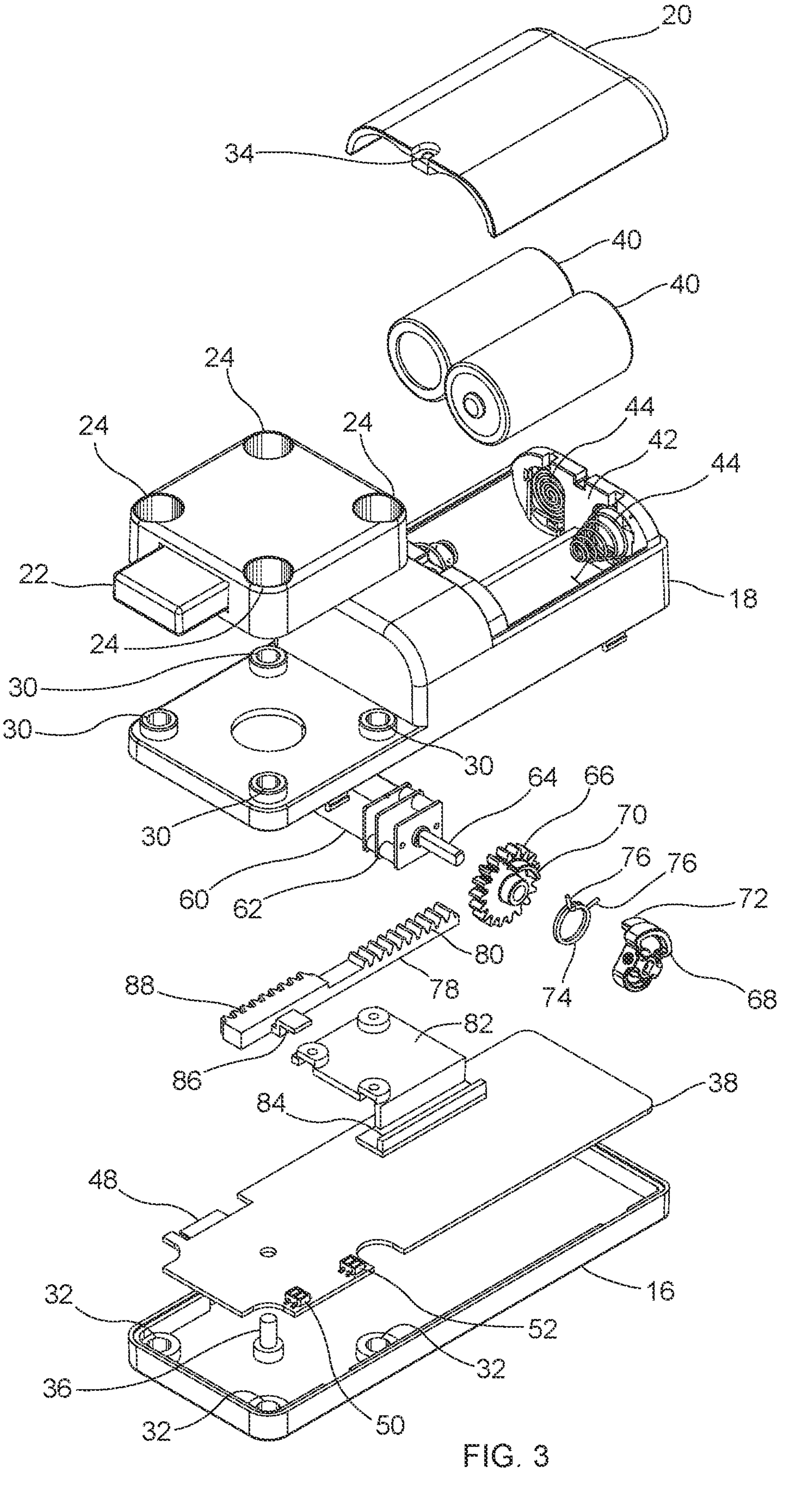
FIG. 3 is a perspective exploded view of the main housing of the lock of FIG. 1.

Referring now to FIG. 3, the components of the main housing 12 are depicted in exploded form. The base 16 and casing 18 in this example are fashioned of molded plastic and are held together via a snap fit. The battery cover 20 is likewise releasably attached to the casing 18, but in this example it is held to the casing 18 via a screw (not shown) extending through a through hole 34 in the battery cover 20 and into an internally threaded receiver in the casing 18. A spindle 36 extends upwardly from the base 16.

Figure 3A:
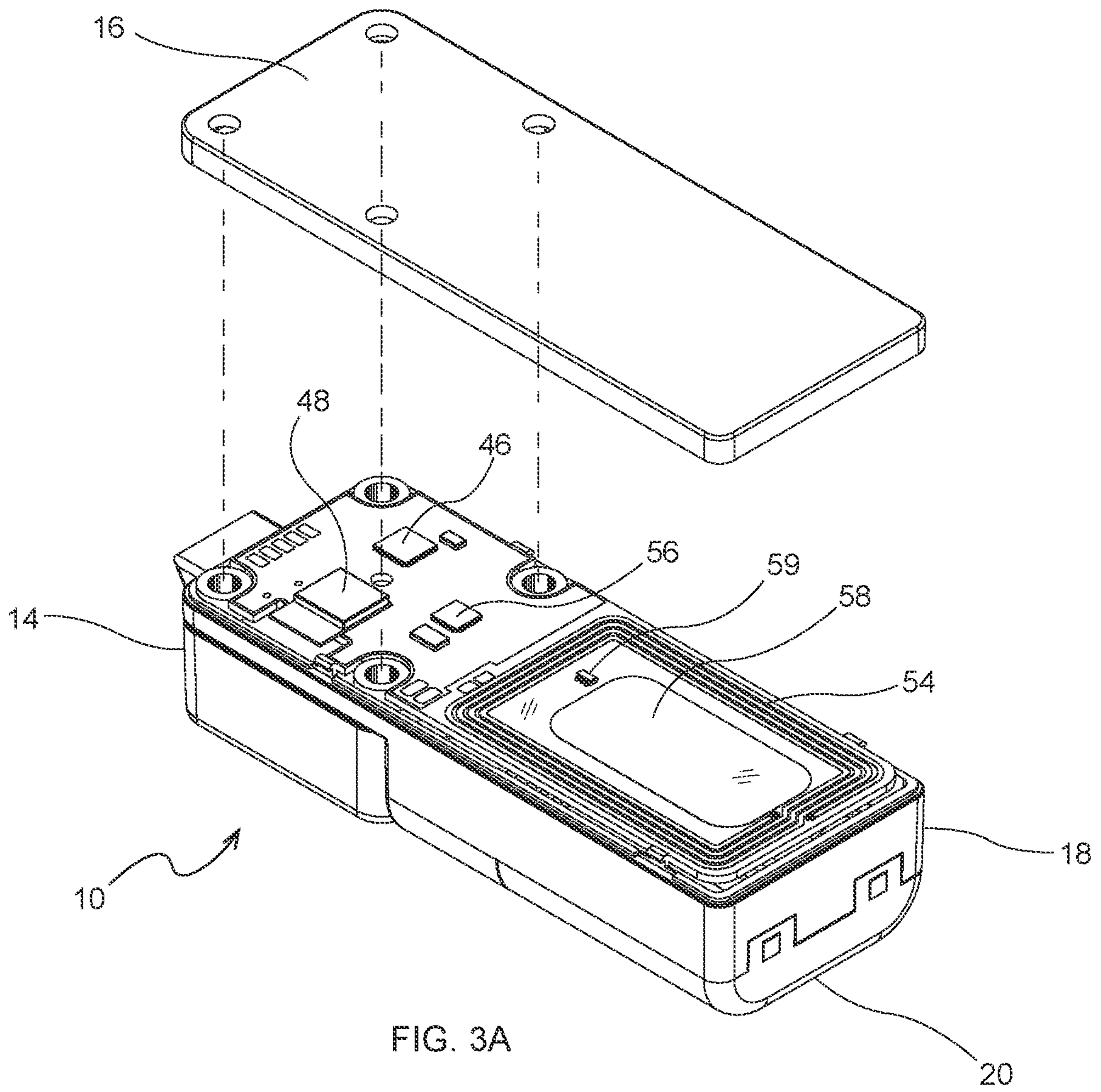
FIG. 3A is a perspective view of the bottom side of the lock of FIG. 1 with the base removed, in particular depicting the bottom side of a circuit board of the lock.

A circuit board 38 is disposed within the base 16 and is sized and shaped to allow passage of the screws 28 and the spindle 36. Power is supplied to the circuit board 38 via two batteries 40, in this case two CR123A batteries, disposed within a battery compartment 42 in the casing 18 and through battery terminals 44 as known in the art. Of course, other sizes, numbers, or configurations of batteries can be used based on the application. As best seen in FIGS. 3 and 3A, the circuit board 38 includes a microprocessor 46, a BLE chip 48, a first proximity switch 50, a second proximity switch 52, an RFID antenna 54, an associated RFID chip 56, and a capacitive sensor 58 and a capacitive sensor chip 59, all of which combine, in part, to control operation of the lock 10. In this case, the microprocessor 46 includes memory, but, as is known, separate memory devices, such as EEPROM chips, can be mounted to the circuit board 38. In this example, the first and second proximity switches 50, 52 are reflective object sensors, but other proximity switches can be used and will be known by those of skill in the art.

An actuator 60 is connected to the circuit board 38 and receives power and control signals via the microprocessor 46. In this example, the actuator 60 includes an electric motor 60, but other actuators, such as solenoids, could be used. The electric motor 60 includes a series of reducing gears 62 and an output shaft 64. A first gear 66 and a motor cam 68 are both disposed on the output shaft 64. The first gear 66 is not affixed directly to the output shaft 64. Instead, the motor cam 68 is affixed directly to the output shaft 64 via a pair of set screws (not shown). The first gear 66 includes a lateral arch 70 extending out toward the motor cam 68, and the motor cam 68 includes a complementary lateral arch 72 extending toward the first gear 66. When assembled, the two lateral arches 70, 72 overlie each other. A torsion spring 74 is disposed on the output shaft 64 between the motor cam 68 and the first gear 66, and it has ends 76 that extend out and capture the lateral arches 70, 72. When the motor 60 rotates, it rotates the output shaft 64 and the motor cam 68 directly, and the motor cam 68 rotates the first gear 66 through the torsion spring 74.

A rack gear 78 is disposed in the base 16 and includes a first set of teeth 80 that face upward and engage the first gear 66. A rack support tray 82 is mounted to the underside of the casing 18 and includes a linear guideway 84 in which the rack gear 78 slides. Extending off one side of the rack gear is sensor target 86, which interacts with the proximity switches 50, 52. The rack gear 78 further includes a second set of teeth 88 extending laterally. As can be readily seen, when the electric motor 60 turns the output shaft 64, the rack gear 80 will translate linearly within its guideway 84.

Figure 4:
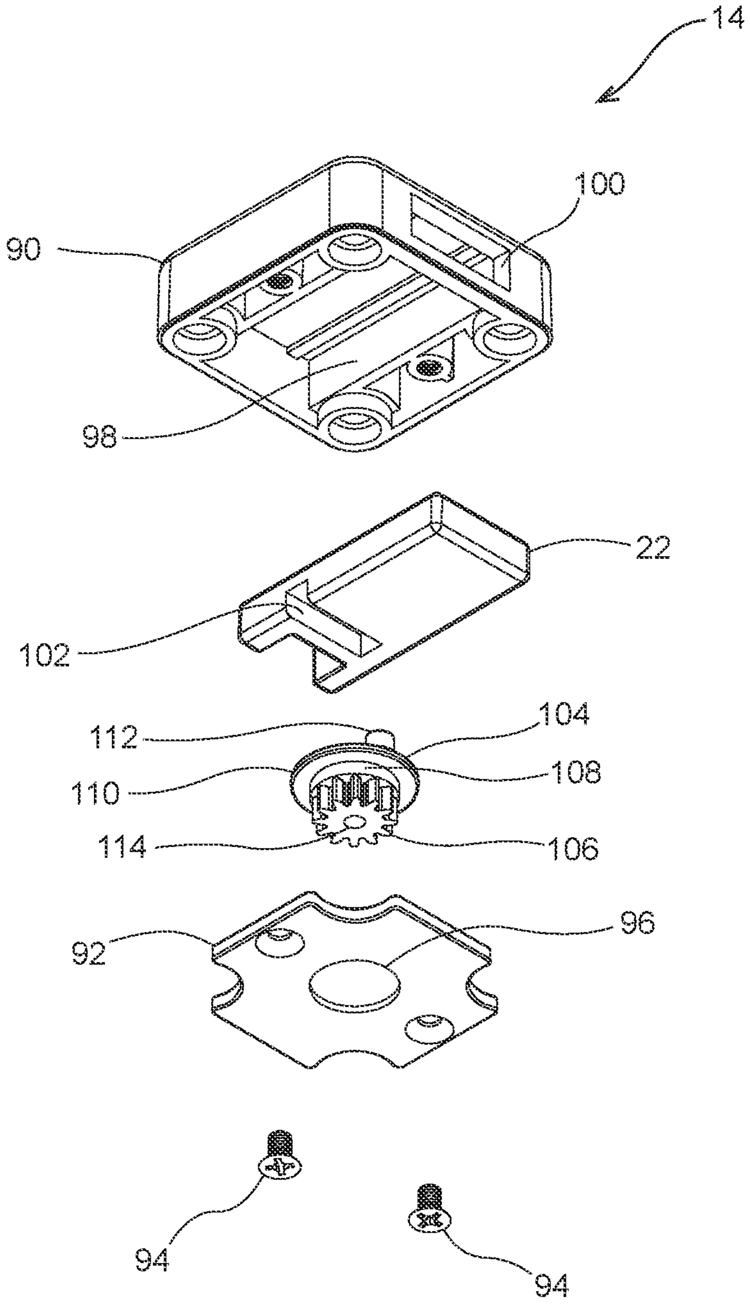
FIG. 4 is a perspective exploded view of the lock housing of the lock of FIG. 1.

Referring now to FIG. 4, the underside of the lock housing 14 is shown in exploded view. The lock housing 14 is defined by an upper shell 90 and a bottom plate 92 that are affixed together via two screws 94, and the bottom plate 92 includes an access hole 96. Within the lock housing 14 is the bolt 22. The upper shell 90 defines a bolt guideway 98 and a bolt opening 100. The bolt guideway 98 limits motion of the bolt 22 to linear motion, and the bolt 22 translates linearly through the bolt opening 100 between the locked position and unlocked position. The bolt 22 further includes a lateral slot 102 on its underside.

Also within the lock housing 14 is a bolt driver 104. The driver 104 is an integral member comprising a drive gear 106, a cylinder 108, a flange extending radially outward 110, and a drive cam 112. The drive cam 112 includes a finger that extends upwardly into the lateral slot 102 of the bolt 22. The drive gear 106 extends downwardly through the access hole 96 of the bottom plate 92, with the flange 110 supporting the driver 104 from within the lock housing 14 against the bottom plate 92. The cylinder 108 of the driver 104 is concentric with the access hole 96 of the bottom plate 92, thereby defining the location and axis of rotation of the drive gear 106. The drive gear 106 can include a center hole 114 that mounts on to the spindle 36 such that the spindle 36 functions as an axle.

Figure 5:
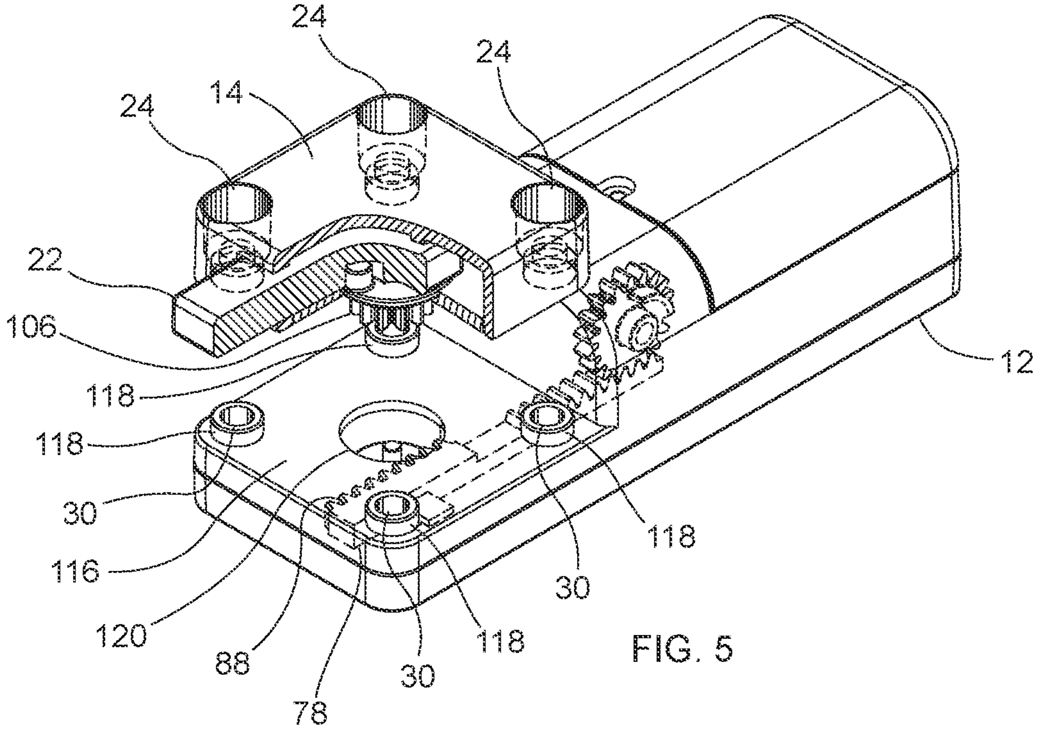
FIG. 5 is a perspective view, in partial cut-away, with the lock housing removed from the main housing of the lock of FIG. 1.

FIG. 5 is a partial cutaway view of the lock 10 as the lock housing 14 is about to be mounted to the main housing 12. The main housing 12 can include a receiver surface 116 with upstanding locator cylinders 118 surrounding the case mounting holes 30. The cylinders 118 may provide an interference fit or snap fit into the through holes 24 of the lock housing 14 and positively locate the lock housing 14 to the main housing 12. By placing the lock housing 14 onto the receiver surface 116 of the main housing 12, the drive gear 106 is inserted through the access hole 120 and into the main housing 12. The teeth of the drive gear 106 mesh with the second set of teeth 88 of the rack gear 78. As can be seen, linear movement of the rack gear 78 will cause rotation of the drive gear 106. Such rotation of the drive gear 106 will rotate the cam 112, and the finger of the cam 112, disposed in the slot 102 of the bolt 22, will cause the bolt 22 to translate linearly within the bolt guideway 98 between the locked position and the unlocked position.

Figure 6:
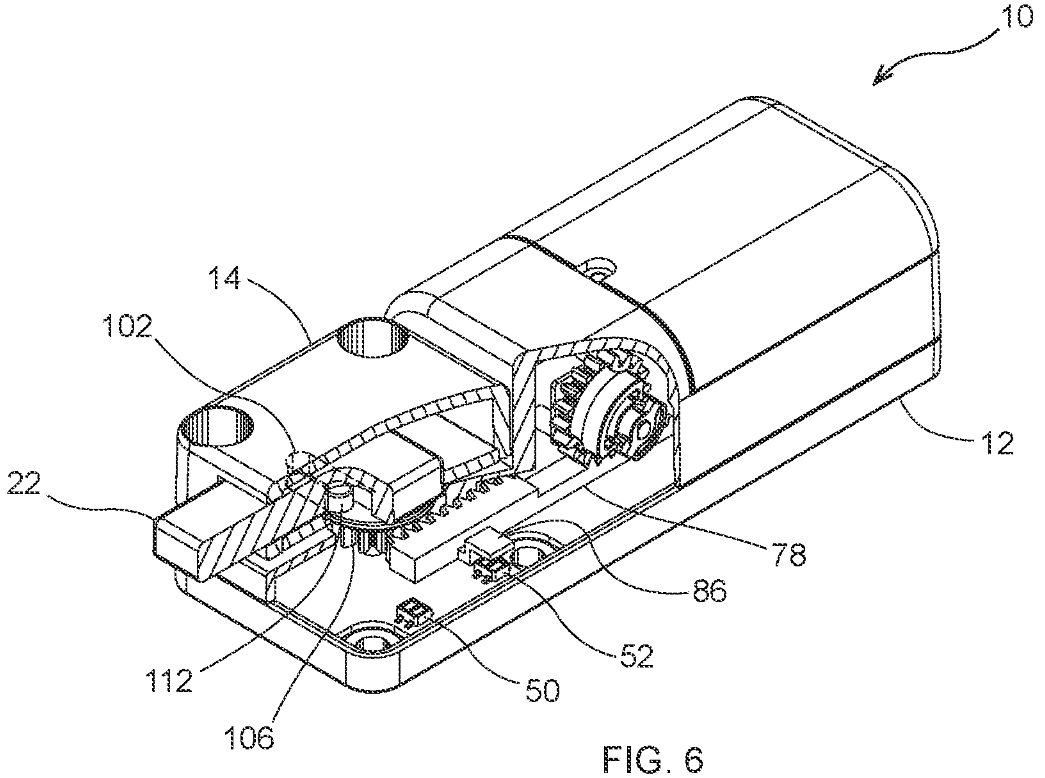
FIG. 6 is perspective view, in partial cut-away, of the lock of FIG. 1 in the locked position.
Figure 7:
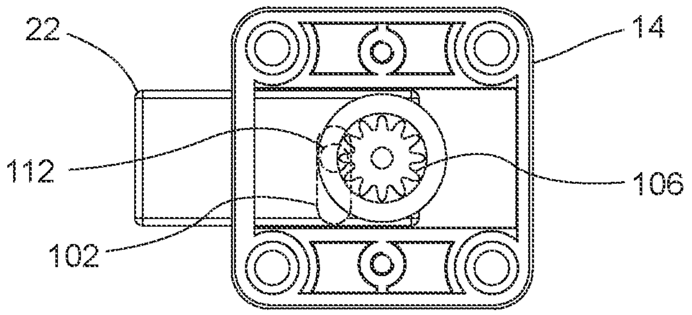
FIG. 7 is a bottom view of the lock housing in the locked position.

FIGS. 6-9 further depict how the rotational movement of the motor 60 causes the linear movement of the bolt 22. To place the lock 10 in the locked position as depicted in FIGS. 6 and 7, the motor 60 rotates in a counterclockwise direction (as viewed in FIG. 6) to cause linear motion of the rack gear 78. The linear motion of the rack gear 78 causes rotation of the drive gear 106, and therefore rotation of the drive cam 112. As the drive cam 112 rotates, the finger of the cam 112, residing in the slot 102 within the bolt 22, pushes the bolt 22 out to the locked position seen in FIGS. 6 and 7. The motor 60 rotates to cause linear motion of the rack gear 78 until the sensor target 86 of the rack gear 78 trips the second switch 52. At that point, the microprocessor 46 signals the motor 60 to stop rotating.

Figure 8:
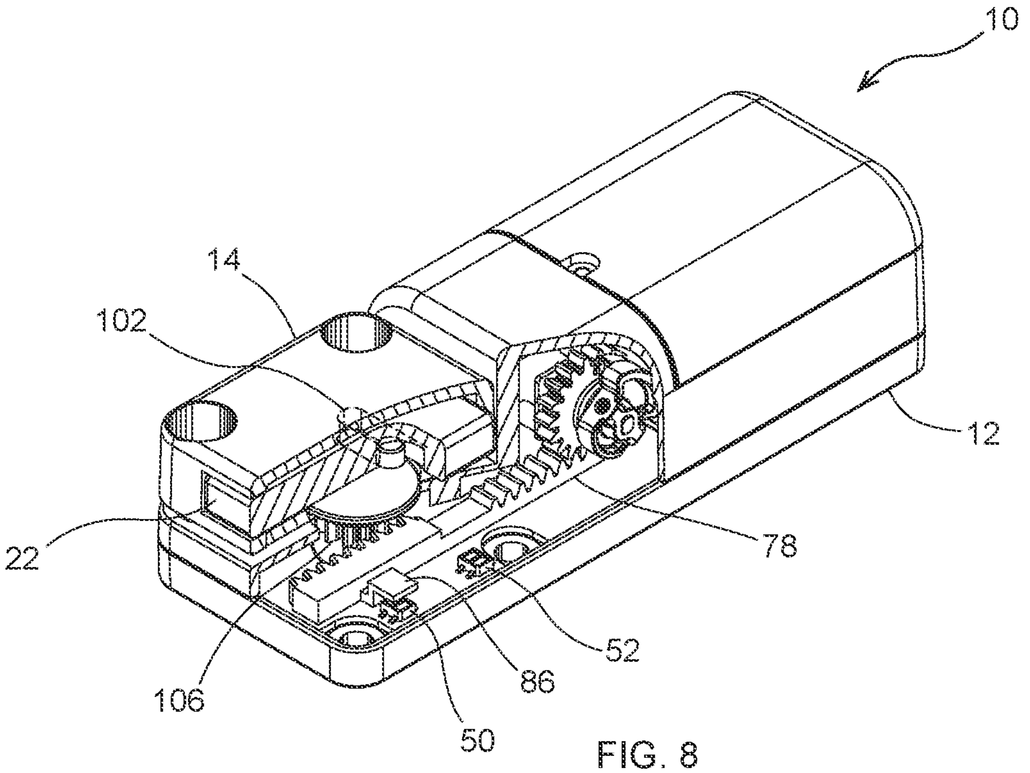
FIG. 8 is a is perspective view, in partial cut-away, of the lock of FIG. 1 in the unlocked position.
Figure 9:
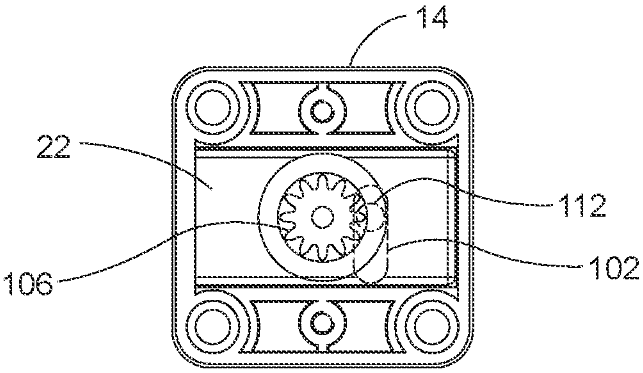
FIG. 9 is a bottom view of the lock housing in the unlocked position.

To retract the bolt 22 into the lock housing 14 as shown in FIGS. 8 and 9, the microprocessor 46 causes the motor 60 to rotate the output shaft 64 clockwise, thereby pushing the rack gear 78 forward and away from the electric motor 60 until the sensor target 86 reaches the first switch 50. This causes the drive gear 106 to rotate clockwise, and the cam finger pulls the bolt 22 within the lock housing 14 and into the unlocked position shown in FIGS. 8 and 9.

Figure 10:
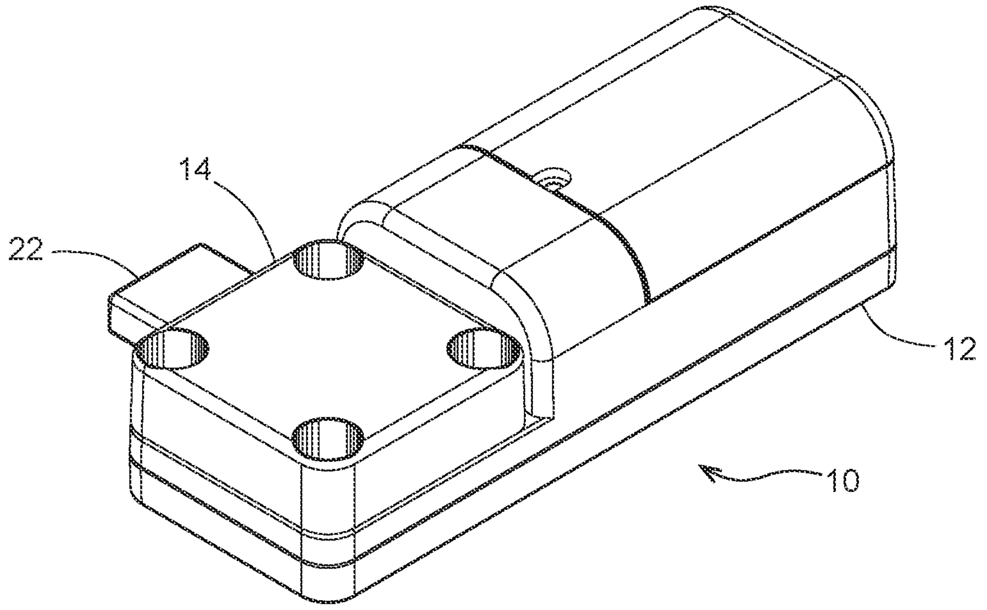
FIG. 10 is a perspective view of the lock of FIG. 1 with the lock housing in the left orientation.
Figure 11:
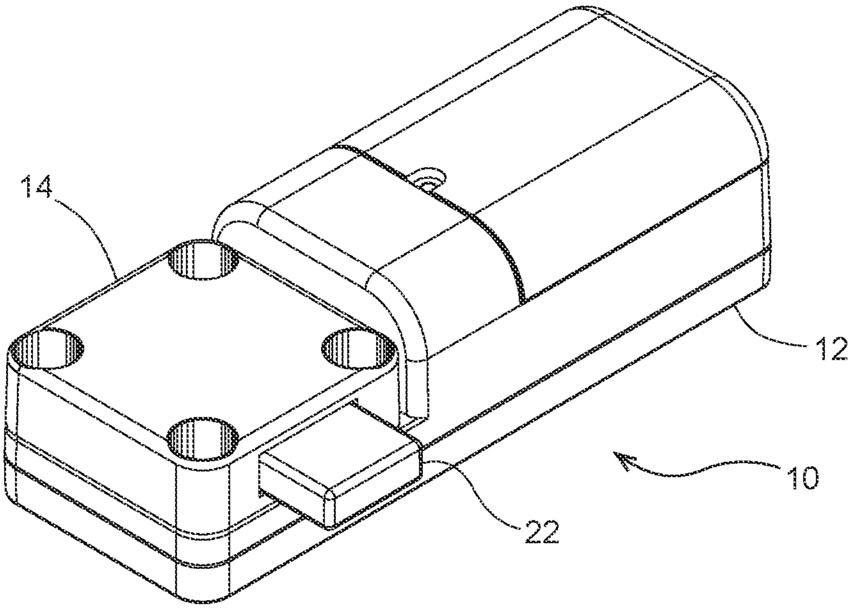
FIG. 11 is a perspective view of the lock of FIG. 1 with the lock housing in the right orientation.

While the previous figures depict the lock 10 operating in a forward direction, the lock housing 14 can also be mounted to the main housing 12 in a left configuration and a right configuration, as shown in FIGS. 10 and 11, respectively, with the cylinders 118 engaging the mounting holes 30. To reorient the latch housing 14, nothing need be done except remove the lock housing 14 from the main housing 12, rotate it to the desired position, and place it back down on the main housing 12. The drive gear 106 will mesh with the second set of teeth 88 of the rack gear 78 no matter which of the three orientations is selected, and the lock 10 will be operable again.

Figure 12:
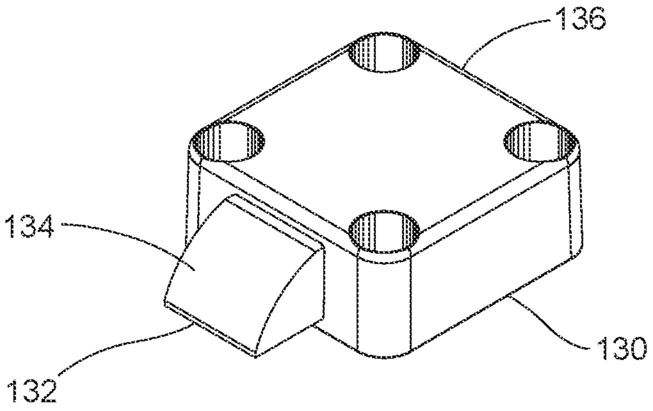
FIG. 12 is a second example of a lock housing including a push-to-close latch that can be used with the main housing of FIG. 1.

Referring now to FIG. 12, a second example of a lock housing 130 that can be used with the main housing 12 is depicted. In this example, instead of the bolt 22 of the first example, a locking element 132 comprises a push-to-close latch 132 that is disposed in the lock housing 130. The latch 132 includes a ramped face 134 and is similar in function to well-known push-to-close latches.

Figure 13:
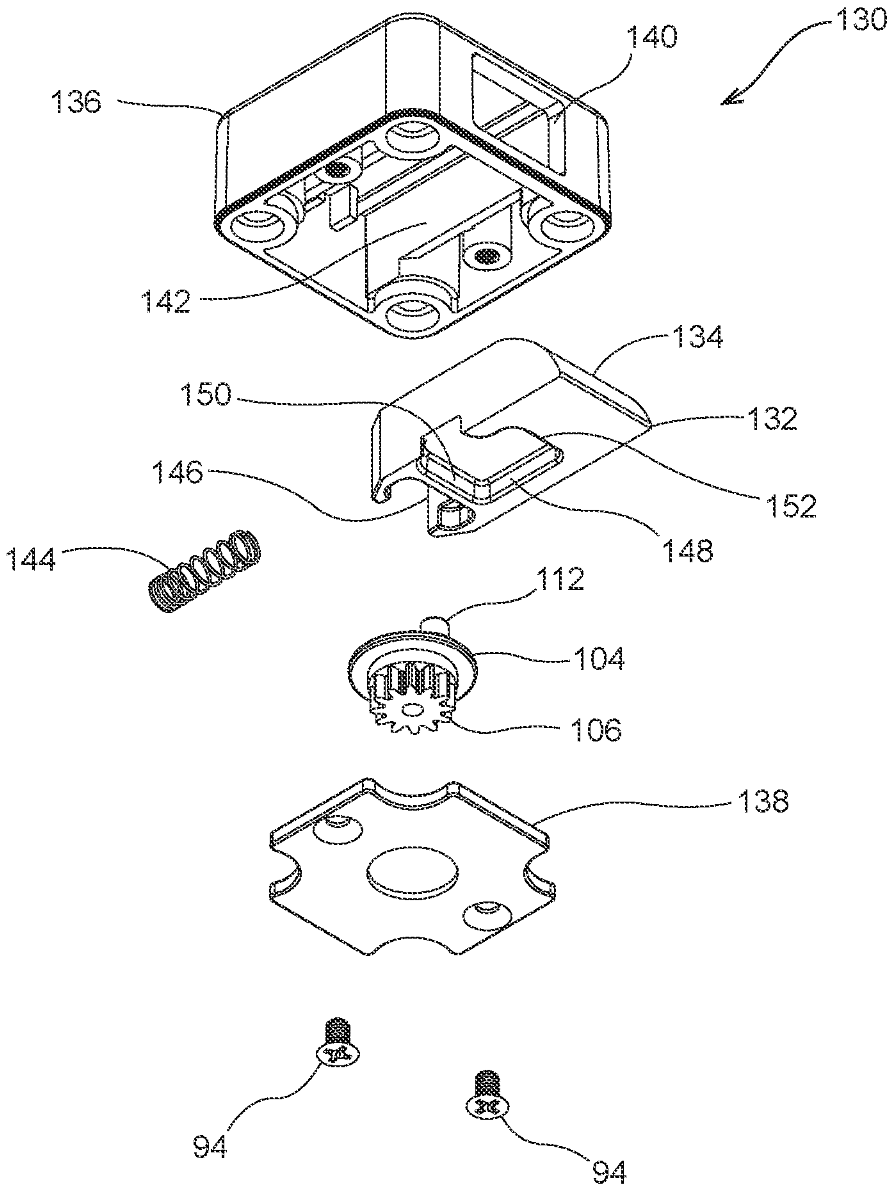
FIG. 13 is an exploded perspective view of the lock housing of FIG. 12.

As can be seen in FIG. 13, the lock housing 130 includes a shell 136, a base plate 138, a latch opening 140, and latch guideway 142 similar to the corresponding elements in the first example. Moreover, the driver 104 is the same as in the first example. In the second example, however, the lock housing 130 also includes a spring 144 biasing the latch 132 to the locked position, and the latch 132 includes a spring retainer 146 in which the spring 144 is mounted.

The latch 132 further includes a cavity 148 for receiving the finger of the cam 112. The cavity 148 has a back wall 150 and a front wall 152 nearest the ramp 134. The spring 144 biases the latch 132 toward the latch opening 140 such that the cam finger normally bears against the back wall 150 of the latch 132.

Figure 14:
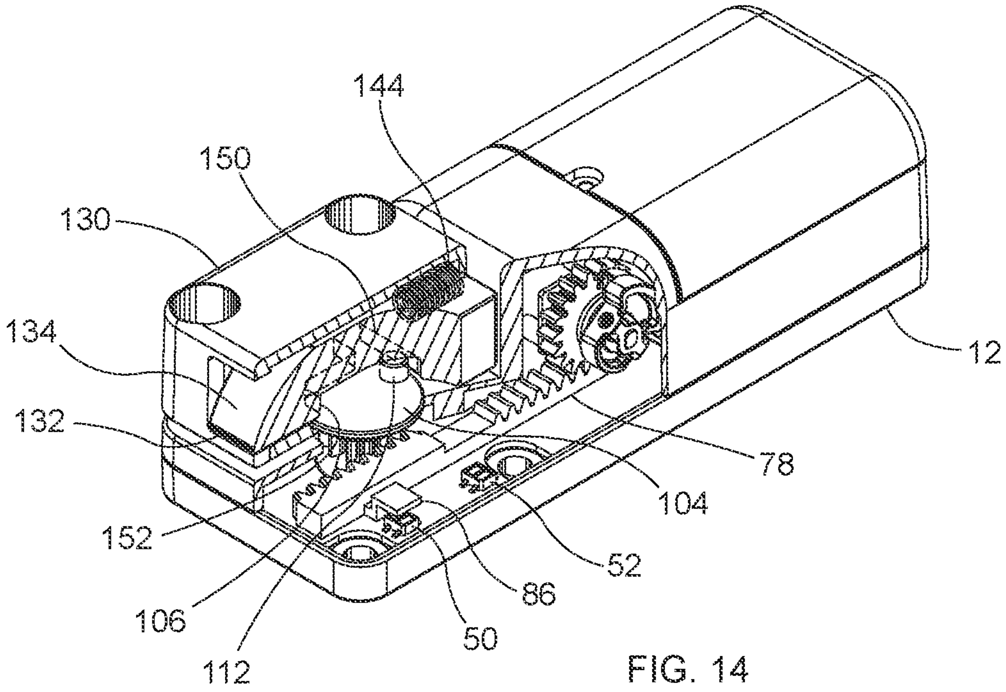
FIG. 14 is a perspective view, in partial cut-away, of the lock, having the lock housing of FIG. 12, in the unlocked position.
Figure 15:
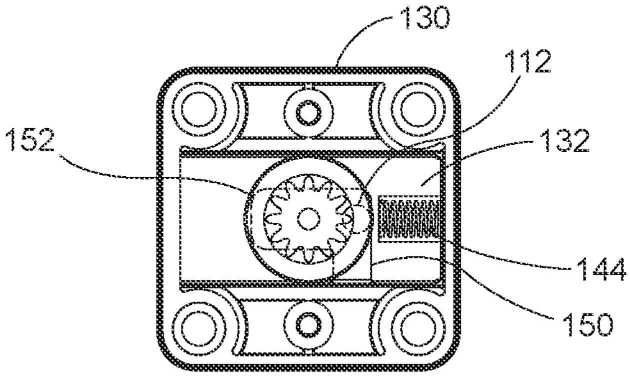
FIG. 15 is a bottom view of the lock housing of FIG. 12 in the unlocked position.
Figure 16:
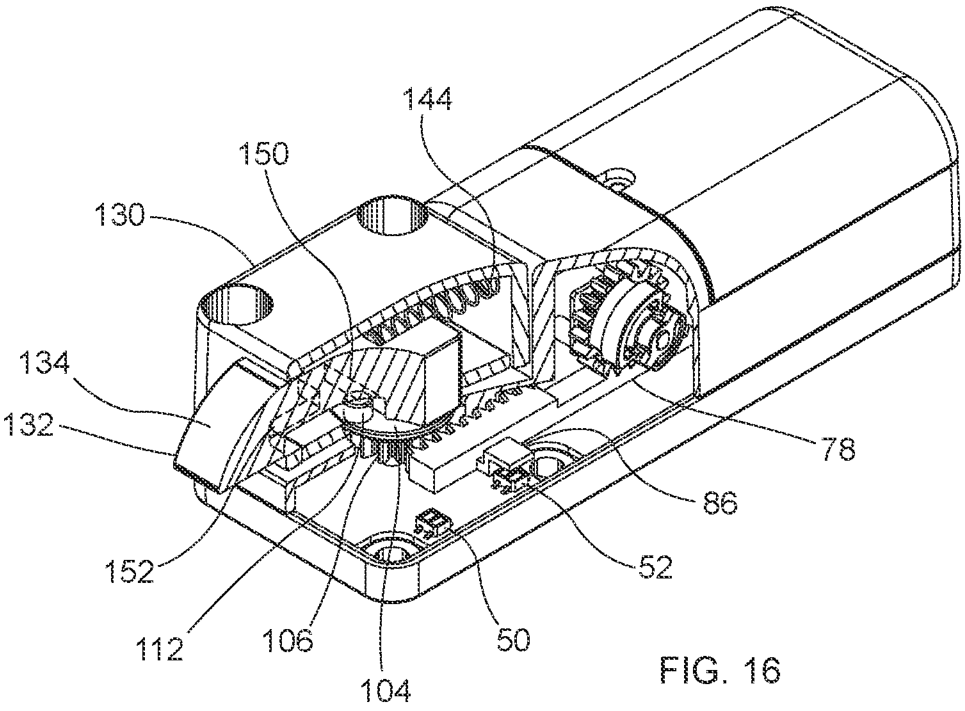
FIG. 16 is a perspective view, in partial cut-away, of the lock, having the lock housing of FIG. 12, in the locked position.
Figure 17:
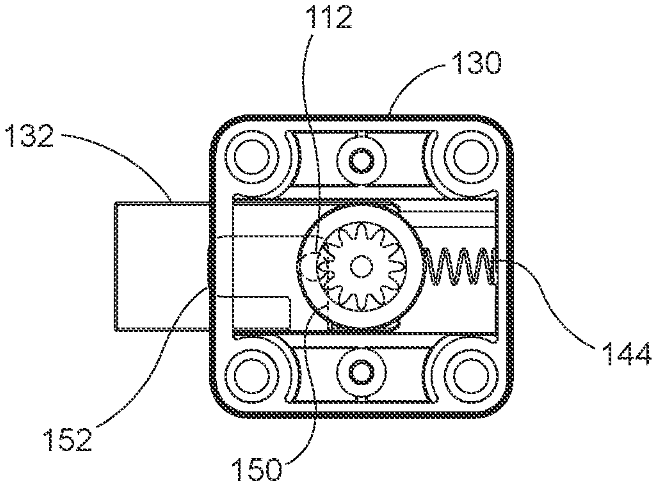
FIG. 17 is a bottom view of the lock housing of FIG. 12 in the locked position.

FIGS. 14-18 depict how the rotational movement of the motor 60 causes the linear movement of the latch 132. In FIGS. 14 and 15, the motor 60 has driven the rack gear 78 forward, i.e., away from the motor 60, and the cam 112, bearing against the back wall 150 of the cavity 148, has pulled the latch 132 toward the motor 60 and into the lock housing 130 to the unlocked position. FIGS. 16 and 17 depict the opposition situation, where the motor 60 has rotated the finger of the cam 112 fully away from the motor 60. The spring 144 biases the latch 132 to maintain contact between the back wall 150 of the cavity 148 and the finger of the cam 112, and it pushes the lock 132 forward to the unlocked position.

Figure 18:
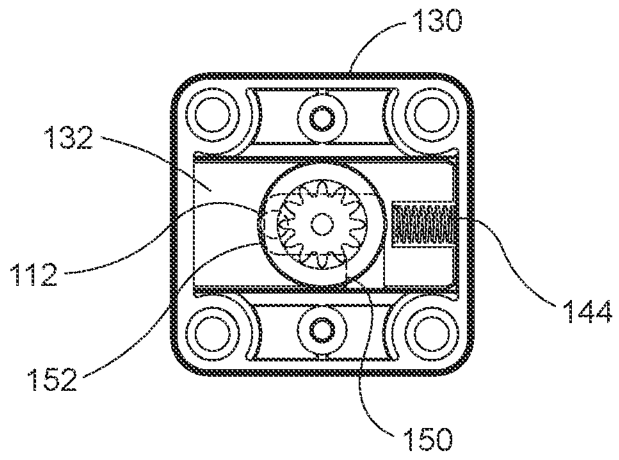
FIG. 18 is a bottom view of the lock housing of FIG. 12 in the locked position, but with the latch pressed into the lock housing.

In FIG. 18, the finger of the cam 112 remains in the same position as in FIGS. 16-17. The latch 132 can be pushed by an external force, however, to be fully inserted within the lock housing 130 against the force of the spring 144. Because the cavity 148 extends in a direction along the length of travel of the latch 132, the finger of the cam 112 does not and cannot prevent the latch 132 from retracting to within the lock housing 130. This is the common motion of a door latch, where the latch is extended out, and when the door is closing, the latch hits the strike plate and the strike plate forces the latch inward until the latch reaches the strike plate recess. The latch then extends fully into the recess of the strike plate, thereby securing the door in a closed position. Accordingly, the lock 130 of the second example allows for the common push-to-close latch.

Figure 19:
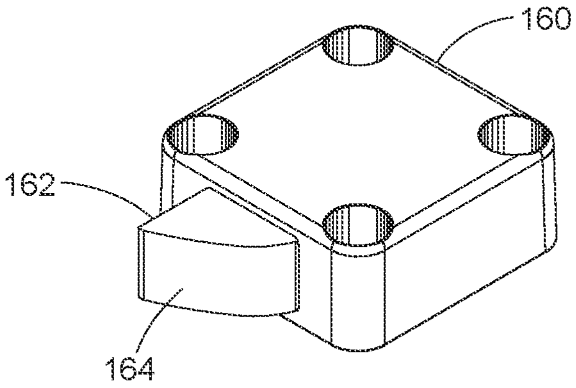
FIG. 19 is a perspective view of a third example of a lock housing including a side latch.
Figure 20:
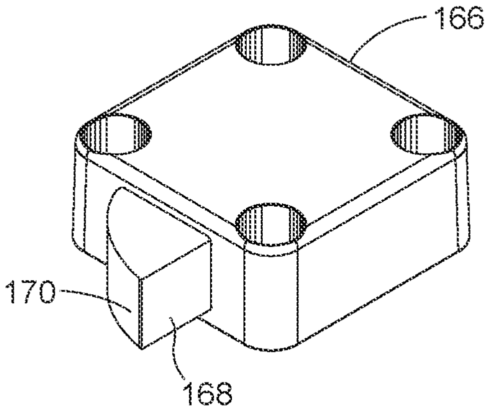
FIG. 20 is a perspective view of a fourth example of a lock housing including a side latch.
Figure 21:
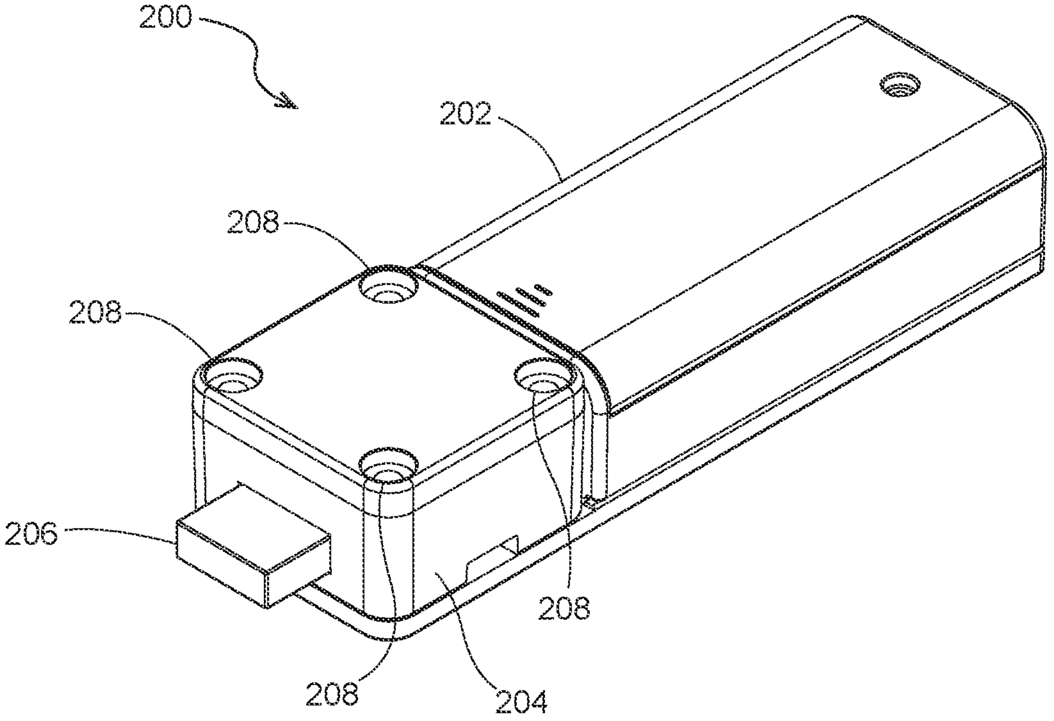
FIG. 21 is a perspective view of a second example of a lock including a lock housing and main housing.

FIGS. 19 and 20 depict third and fourth examples of lock housings that can be used with the main housing 12. FIG. 19 depicts a lock housing 160 with a latch 162 that has ramp face 164 of its right side. FIG. 20, on the other hand, depicts a lock housing 166 with a latch 168 that has a ramp face 170 on its left side. Aside from the direction of the ramped surface of the latches 162, 168, the examples of FIGS. 19 and 20 are the same as the example of FIG. 12.

A second example of a lock 200 is shown in FIGS. 21-28. This lock 200, similar to the first lock 10, includes a main housing 202 and a lock housing 204 with a locking element 206 comprising a bolt extending out from the lock housing 204. The lock 200 includes countersunk mounting holes 208 for fastening to, for example, a door in the same manner as in the first example.

Figure 22:
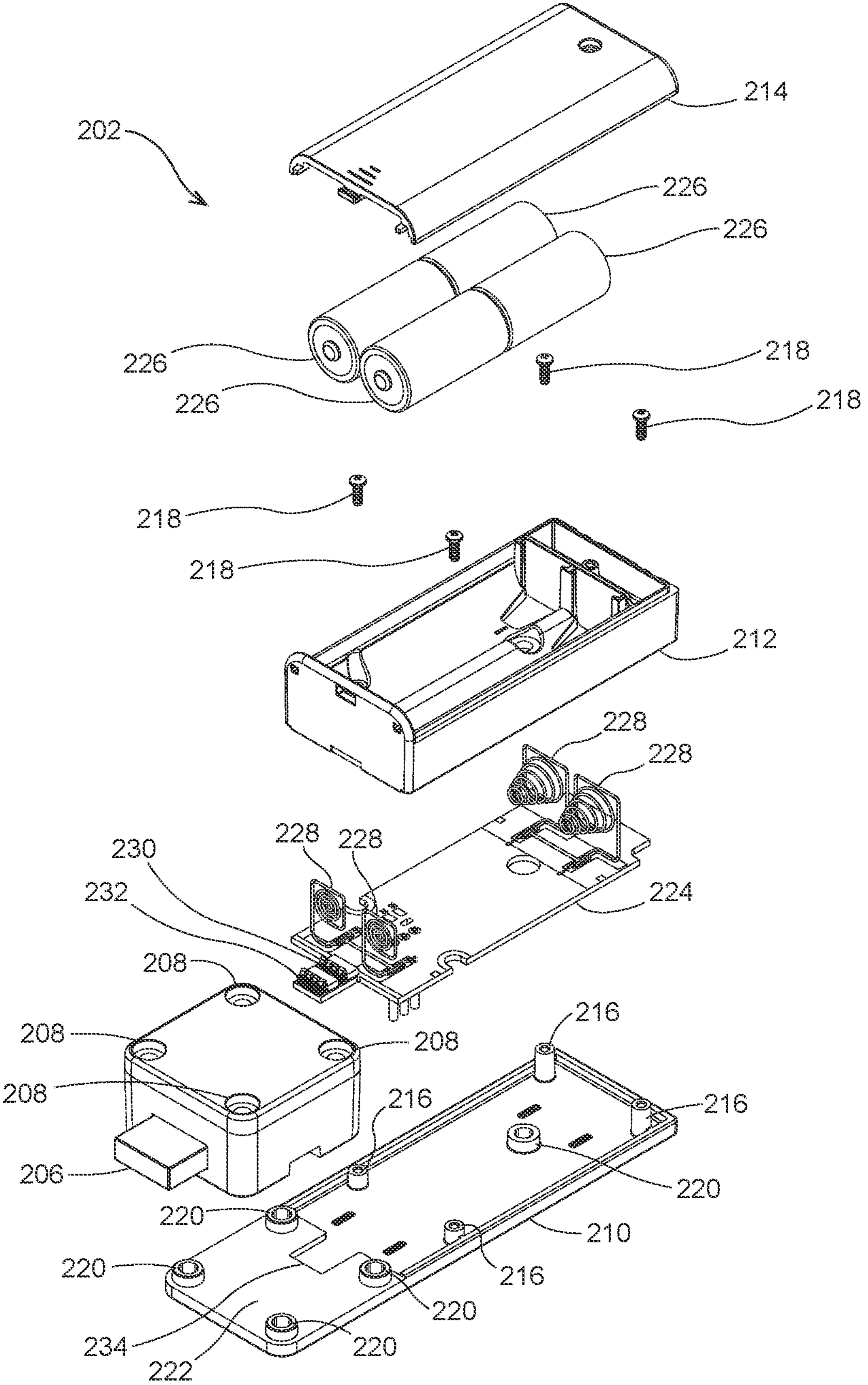
FIG. 22 is an exploded perspective view of the main housing of FIG. 21.

Referring now to FIG. 22, an exploded view of the main housing 202 is shown. The main housing 202 includes a base 210, a battery compartment 212, and a battery cover 214. The base 210 includes four internally threaded cylinders 216, and the battery compartment 212 includes four through holes (not shown) through which screws 218 may mount the battery compartment 212 to the base 210. The base 210 includes five mounting holes 220 which can be used to mount the lock 200 to a door. Four of the mounting holes 220 are coaxial with the mounting holes 208 of the lock housing 204. The base 202 further includes a receiver surface 222 for mounting the lock housing 204.

A circuit board 224 is disposed within the base 210 and is sized and shaped to allow passage of the screws 218 through the mounting holes 220. Power is supplied to the circuit board 224 via, in this example, four batteries 226, contained within the battery compartment 212, and via battery terminals 228 as is known. Similar to the first example, the lock 200 can include a microprocessor, a BLE chip, an RFID chip and antenna, and a capacitive sensor and capacitive sensor chip (none of which are shown). The circuit board 224 further includes a head 230 on which a connector 232 in the form of a set of three spring strips 232, is disposed. Although spring strips 232 are shown, other connectors 232 known in the art can be used. The spring strips 232 are in electrical connection with the microprocessor and can transmit power and control signals. The receiver surface 222 includes a recess 234 in which the head 230 is disposed.

Figure 23:
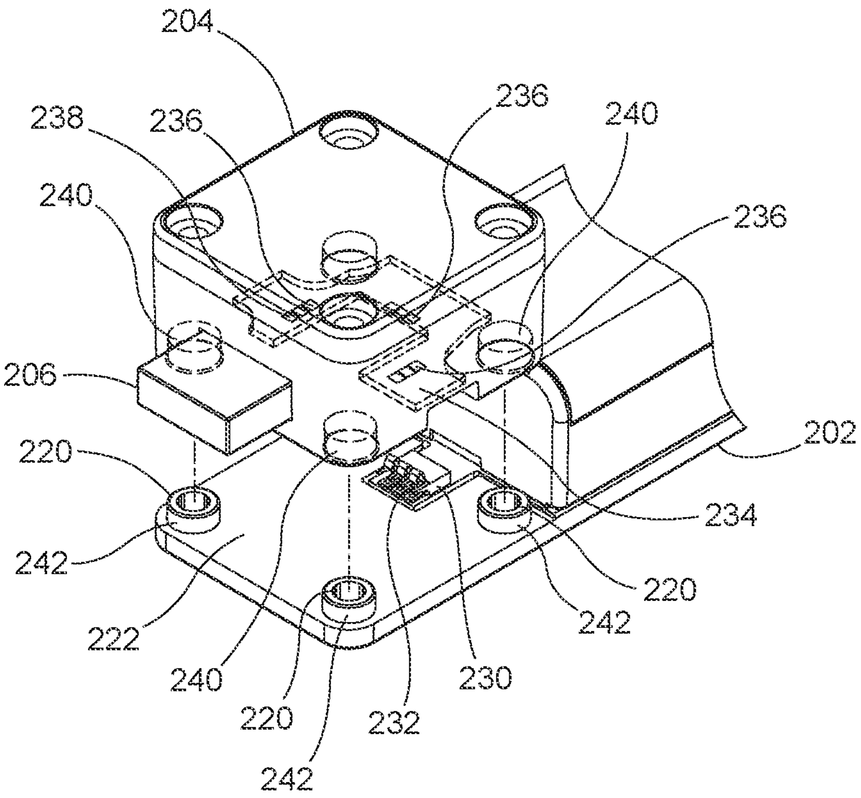
FIG. 23 is a partial perspective exploded view, depicting the circuit board of the lock housing of FIG. 21.

Referring now to FIG. 23, the lock housing 204 is shown, with all internal elements removed for clarity except a secondary circuit board 234. The secondary circuit board 234 includes three receivers 236 in the form of three contact pads 236, where each receiver 236 includes a set of three contacts 238. The contact pads 236 can receive power and control signals via the spring strips 232 of the circuit board 224. Again, although the receivers 236 are shown as contact pads 236, other receivers known in the art able to create an electrical connection can be used.

The lock housing 204 further includes recesses 240 aligned with the mounting holes 208, and the receiver surface 222 of the base 210 includes locators 242 aligned with the mounting holes 220. The user can mount the lock housing 204 to the main housing 202 in any of the three directions by aligning the locators 242 with the recesses 240. The contact pads 236 are configured such that the spring strips 232 will be aligned with and contact one of the contact pads 236 no matter if the lock housing 204 is placed in the left, right, or forward orientation. Note that the countersunk mounting holes 208 extend to the recesses 240, allowing mounting as in the first example.

Figure 24:
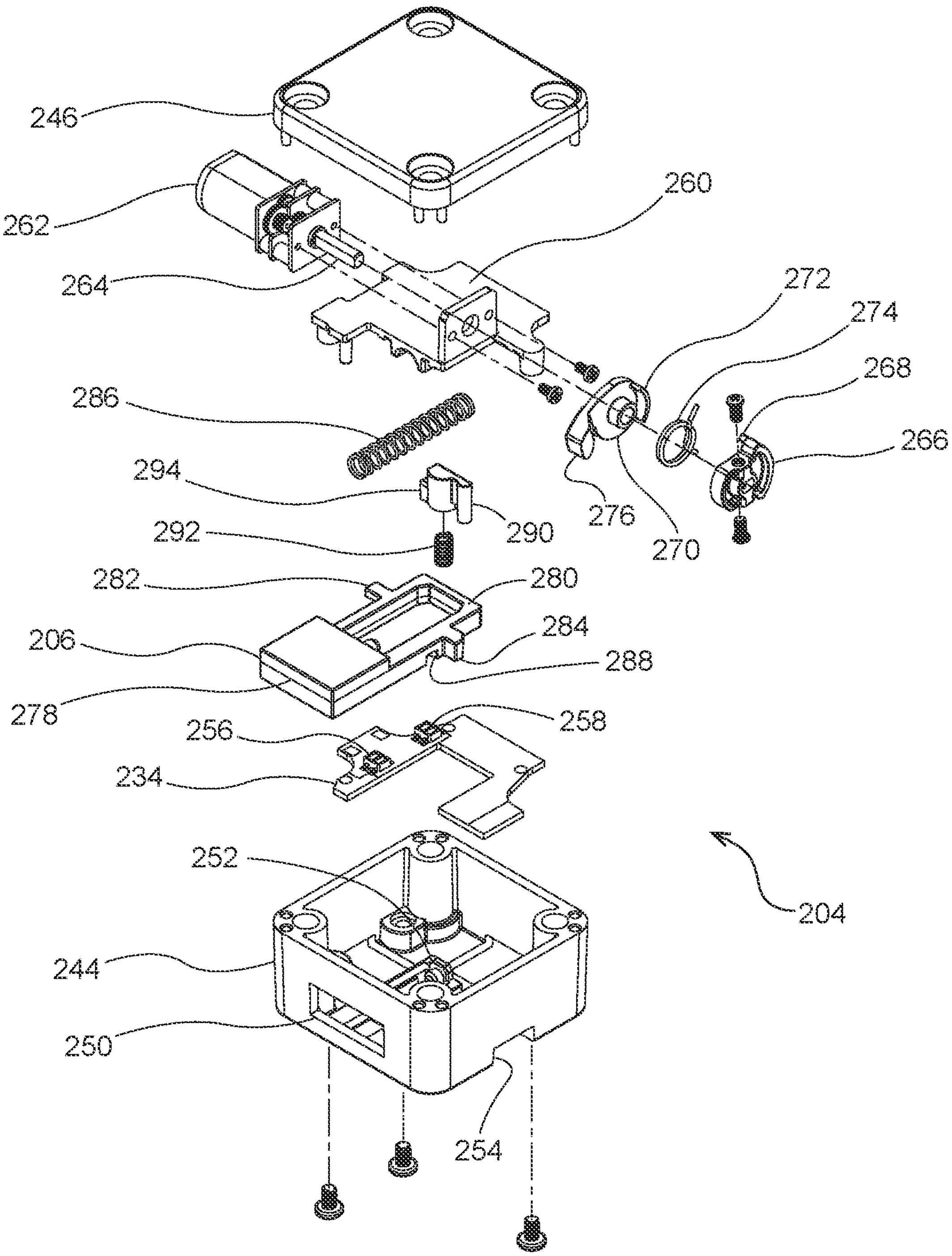
FIG. 24 is a perspective exploded view, depicting the lock housing of FIG. 21.

FIG. 24 is an exploded view of the lock housing 204. The lock housing 204 includes a shell 244, a cap 246, and the bolt 206. The shell 244 includes a bolt opening 250 on one side and has a bolt guideway 252 that limits the bolt 248 to linear motion. The shell 244 further includes recesses 254 on the other three sides that are shaped and sized to receive the head 230 of the circuit board 224. And as further disclosed in FIG. 24, disposed on the secondary circuit board 234 is a first proximity switch 256 and a second proximity switch 258.

Disposed within the lock housing 204 is a support plate 260, and on the support plate 260 is an actuator 262. In this example, the actuator 262 includes an electric motor 262, but other types of actuators, such as solenoids, can be used. The electric motor 262 is connected to the receivers 236 (not shown in FIG. 24 for clarity) on the secondary circuit board 234, and therefore receives power and control signals via the microprocessor. An output shaft 264 extends out of one end of the motor 262. Much like in the earlier disclosed example, a motor cam 266 is affixed to the end of the output shaft 264 and includes an arch 268 laterally extending toward the motor 262. A cam driver 270 is also disposed on the output shaft 264 and includes a lateral arch 272. The cam driver 270 is connected to the motor cam 266 via a torsion spring 274 in the same manner as in the first example. In this example, the cam driver 270 includes an arm 276.

The bolt 206 includes a head 278 and a frame 280. Extending off a first leg of the frame 280 is a sensor target 282 that interacts with the first and second switches 256, 258 much in the same manner as in the first disclosed example. Extending off a second leg of the frame is a follower 284 for interacting with the arm 276 of the cam driver 270. A spring 286 is mounted within the latch housing 204 and biases the bolt 206 to the locked position. Finally, a notch 288 is disposed in the bottom of the frame 280.

A dead bolt 290 is further disposed within the lock housing 204. The dead bolt 290 is constrained to only move vertically and is further biased in an upward direction by a spring 292. The dead bolt 290 includes a pawl 294 that interacts with the notch 288 in the frame of the bolt 206 (which constrains it to vertical motion), while the dead bolt 290 itself interacts with the arm 276 of the cam driver 290.

Figure 25:
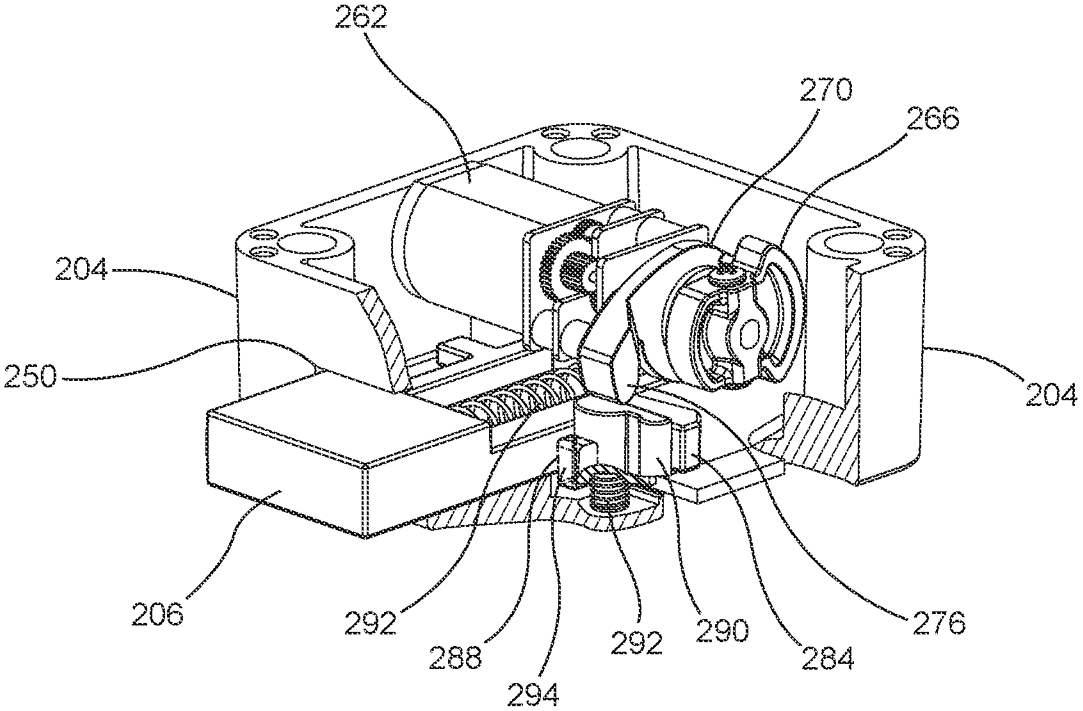
FIG. 25 is a perspective cut-away view of the lock housing of FIG. 21 in the locked position.
Figure 26:
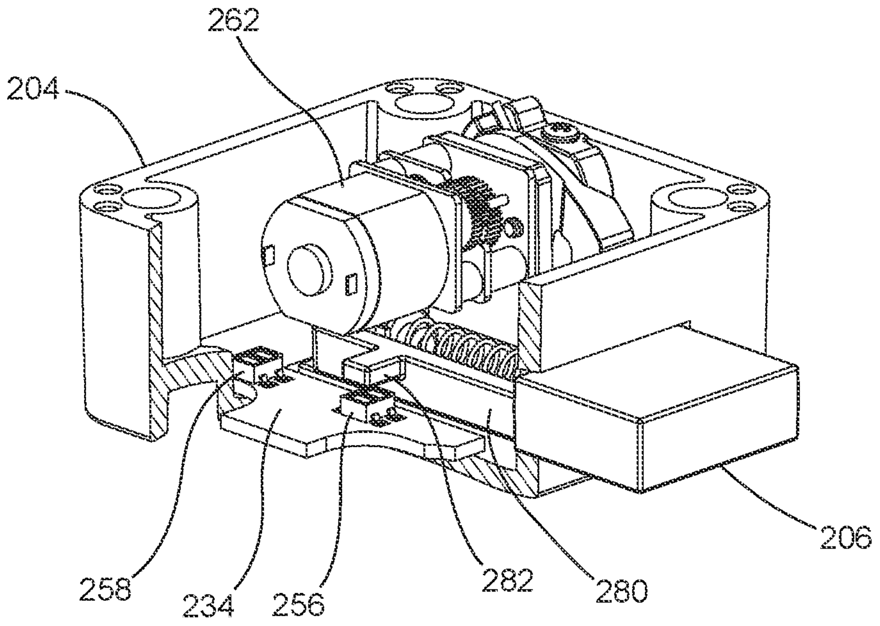
FIG. 26 is a perspective cut-away view of the lock housing of FIG. 21 in the locked position.

Referring now to FIGS. 25 and 26, the lock housing 204 is shown in the locked position. The bolt 206 is extended out through the bolt opening 250 in the lock housing 204, and the deadbolt 290 is shown extended vertically such that the pawl 294 is disposed within the notch 288 of the bolt 206, thereby locking the bolt 206 in the locked position. The arm 276 of the cam driver 270 has been rotated to a position above the deadbolt 290. Referring in particular to FIG. 26, the sensor target 282 is disposed over the first switch 256, thereby indicating to the microprocessor that the bolt 206 is in the locked position.

Figure 27:
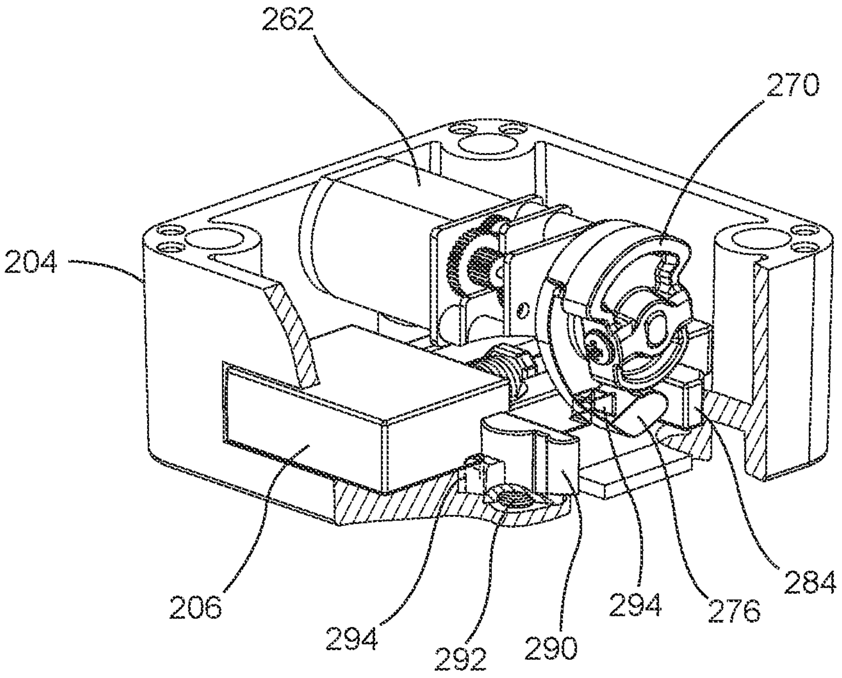
FIG. 27 is a perspective cut-away view of the lock housing of FIG. 21 in the unlocked position.
Figure 28:
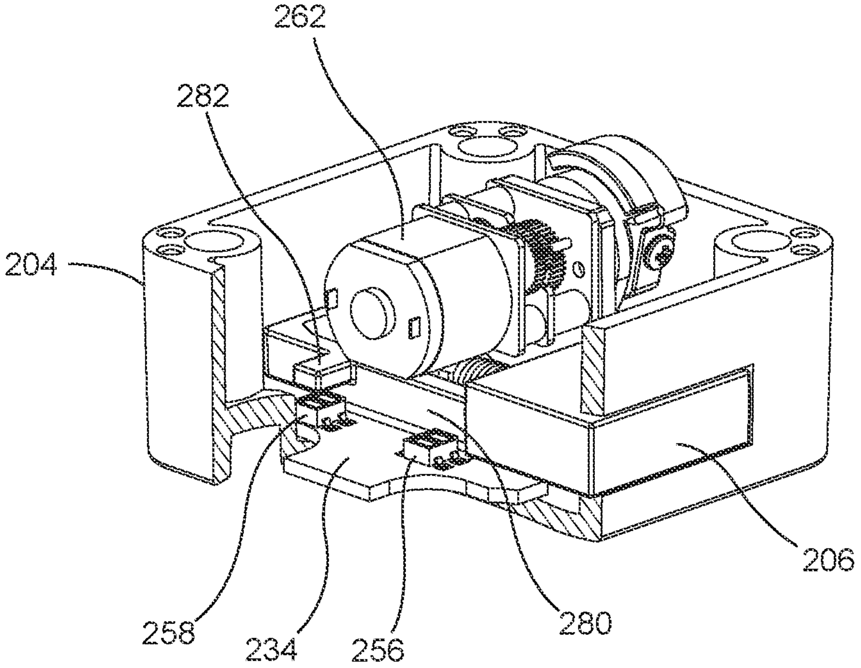
FIG. 28 is a perspective cut-away view of the lock housing of FIG. 21 in the unlocked position.

Referring now to FIGS. 27 and 28, the lock housing 204 has been moved to the unlocked position. The cam driver 270 has been rotated counter clockwise approximately ½ turn. During the rotation, the arm 276 first contacts the deadbolt 290 and pushes it down such that the pawl 294 is released from the notch 288 in the bolt 206, thereby releasing the bolt 206 to travel backwards. As the cam driver 270 rotates further in a counterclockwise direction, it engages the follower 284 of the frame 280 of the bolt 206. As the cam driver 270 continues to rotate, it pulls the follower 284 such that the bolt 206 is pulled into the lock housing 204 until, as shown in FIG. 28, the sensor target 282 has moved backward to the point it is over the second switch 258. At that point, the microprocessor stops the rotation of the motor 262, the bolt 206 is fully contained within the lock housing 204, and the lock 200 is in the unlocked position.

To move the lock 200 back into the locked position, the motor 262 simply rotates in the clockwise direction again, and as the arm 276 rotates, the bolt spring 286 pushes the bolt 206 forward until the follower 284 bears on the deadbolt 290 and the pawl 294 rises up and inserts itself into the notch 288 of the bolt 206 under the force of the deadbolt spring 292.

Figure 29:
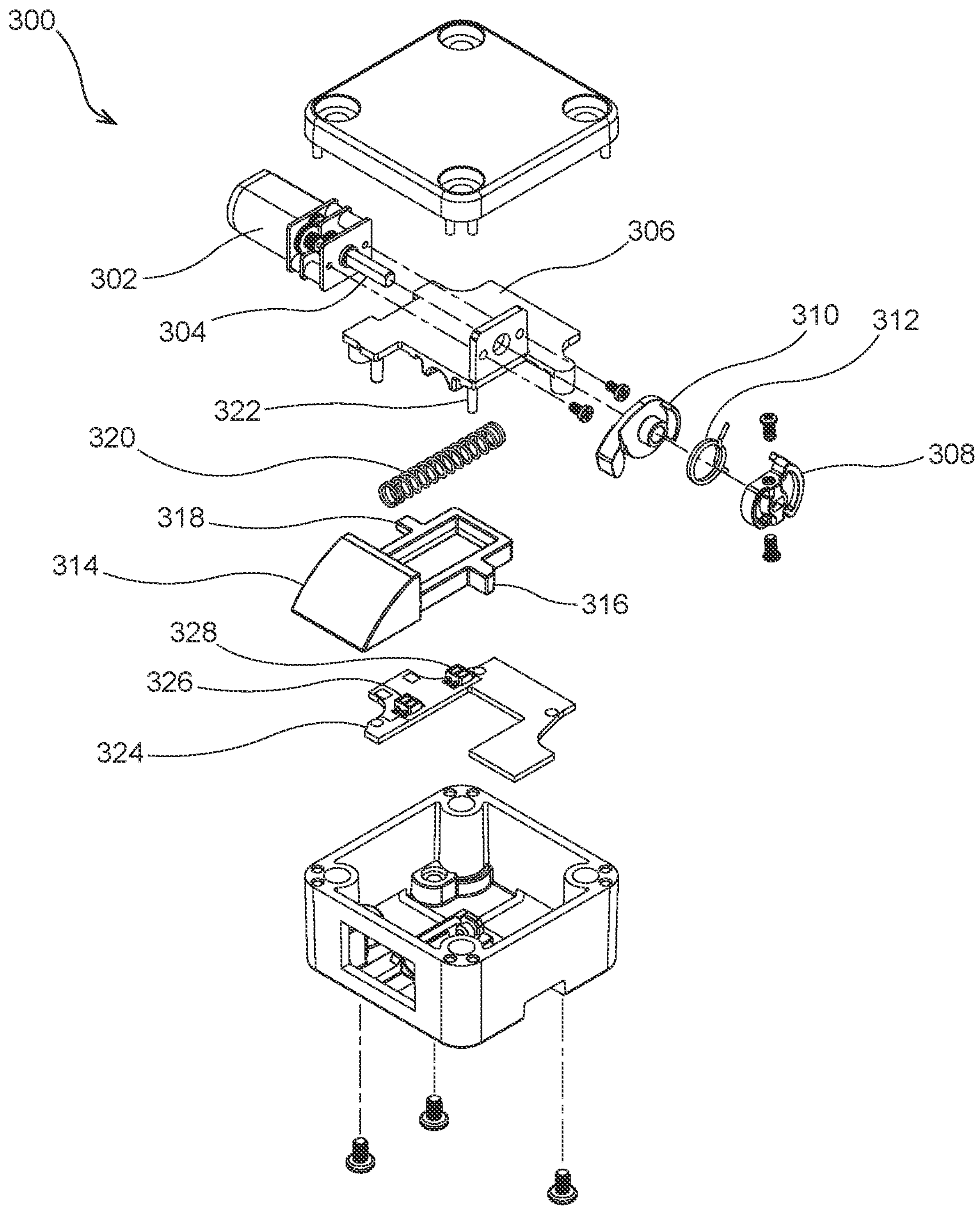
FIG. 29 is a perspective exploded view of a second example of a lock housing for use with the main housing of FIG. 21.

Referring now to FIG. 29, another example of a lock housing 300 is disclosed that can be mounted to main housing 202. Here, the lock housing 300 includes a motor 302, an output shaft 304, a support plate 306, a motor cam 308, a cam driver 310, and a torsion spring 312, the same as in the lock housing 204.

In this example, however, the lock housing 300 includes a push-to-close latch 314 with a follower 316 and a sensor target 318. A spring 320 biases the latch 314 into the locked position. Here, a post 322 extends down from the support plate 306 and interacts with the follower 316 of the latch 314 to prevent the spring 320 from pushing the latch 314 out of the lock housing 300 and retains the latch 314 in the locked position. As in the previous example, the lock housing 300 includes a secondary circuit board 324 along with first and second switches 326, 328. The secondary circuit board 324 further includes three receivers (not shown) as in the previous embodiment. And as in the previous embodiment, the lock housing 300 can be mounted to the main housing 202 in any of three orientations.

Figure 30:
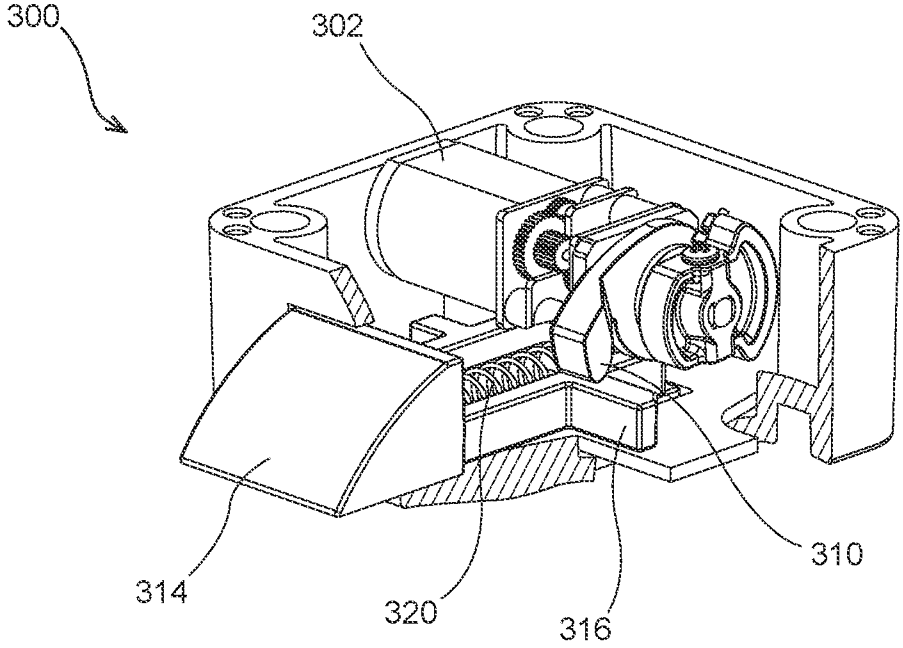
FIG. 30 is a perspective cut-away view of the lock housing of FIG. 29 in the locked position.
Figure 31:
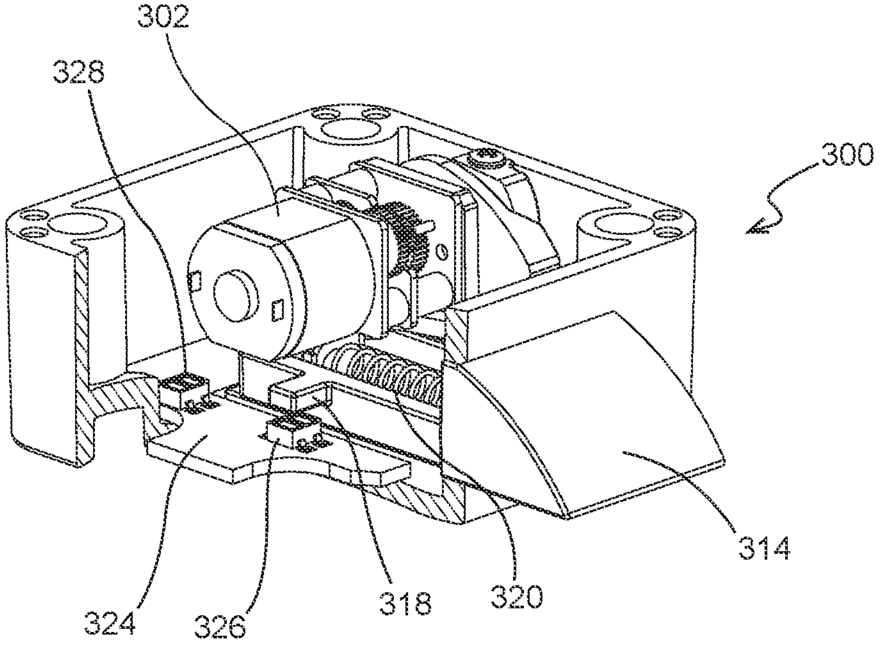
FIG. 31 is a perspective cut-away view of the lock housing of FIG. 29 in the locked position.

The operation of the lock housing 300 can be seen in FIGS. 30-33. In FIG. 30, the cam driver 310 has been rotated clockwise until it is above the follower 316 and has released the follower 316. The spring 320 biases the latch 314 forwardly to the locked position. The post 322 (depicted in FIG. 29, but not in FIG. 30) blocks further forward movement of the follower 316 and retains the latch 314 in the locked position. As shown in FIG. 31, the sensor target 318 is disposed over the first switch 326, and the logic of the microprocessor directs the motor 302 to stop rotating. Again, the latch 314 can be pushed back into the lock housing 300 against the force of the spring 320 as in previous examples and is a push-to-close latch.

Figure 32:
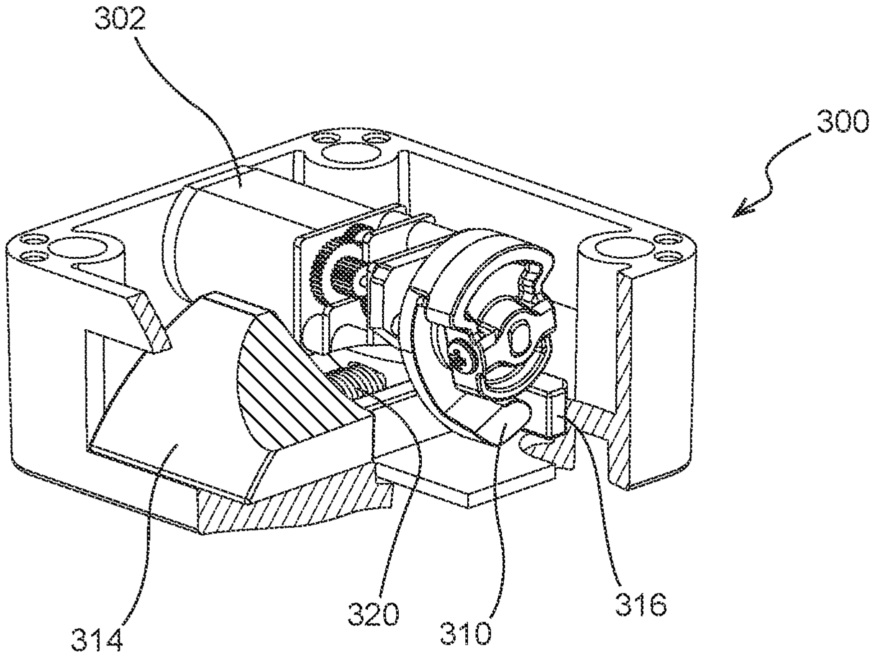
FIG. 32 is a perspective cut-away view of the lock housing of FIG. 29 in the unlocked position.
Figure 33:
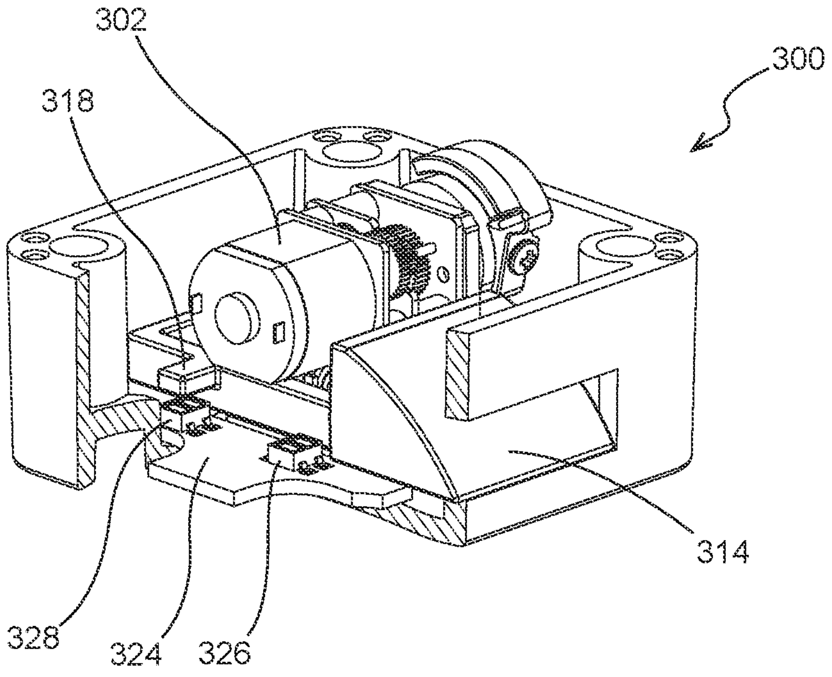
FIG. 33 is a perspective cut-away view of the lock housing of FIG. 29 in the unlocked position.

As shown in FIGS. 32 and 33, the cam driver 310 has been rotated counter clockwise, and the cam driver 310 has pulled the follower 316 against the force of the spring 320 and into the lock housing 300 to the unlocked position. Upon the sensor target 318 reaching the second sensor 328, the motor 302 ceases rotation.

A further example of the multi-directional lock 340 is depicted in FIGS. 34-37. The lock 340 includes a main housing 342 and a lock housing 344. In particular referring to FIGS. 34 and 35, the main housing 342 includes a base 346, a casing 348, and a battery cover 350. The casing 348 defines a battery compartment 352 housing two CR-123 batteries 354 that supply sufficient power to power the lock 340.

Figure 34:
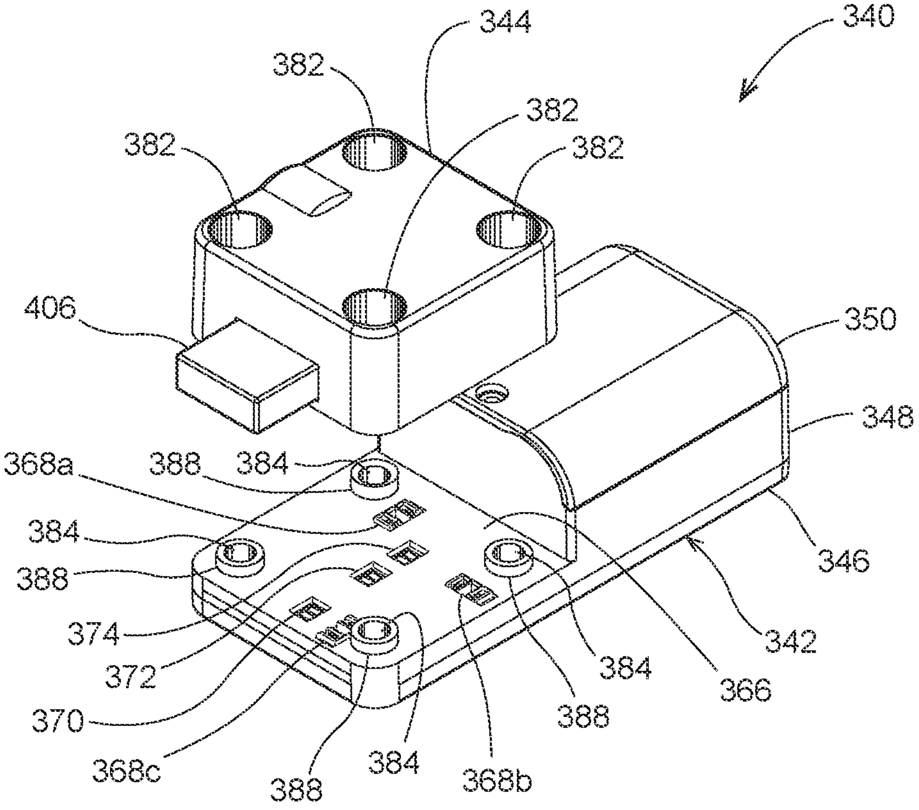
FIG. 34 is a perspective view of a further example of a lock, with the lock housing removed from the main housing.
Figure 35:
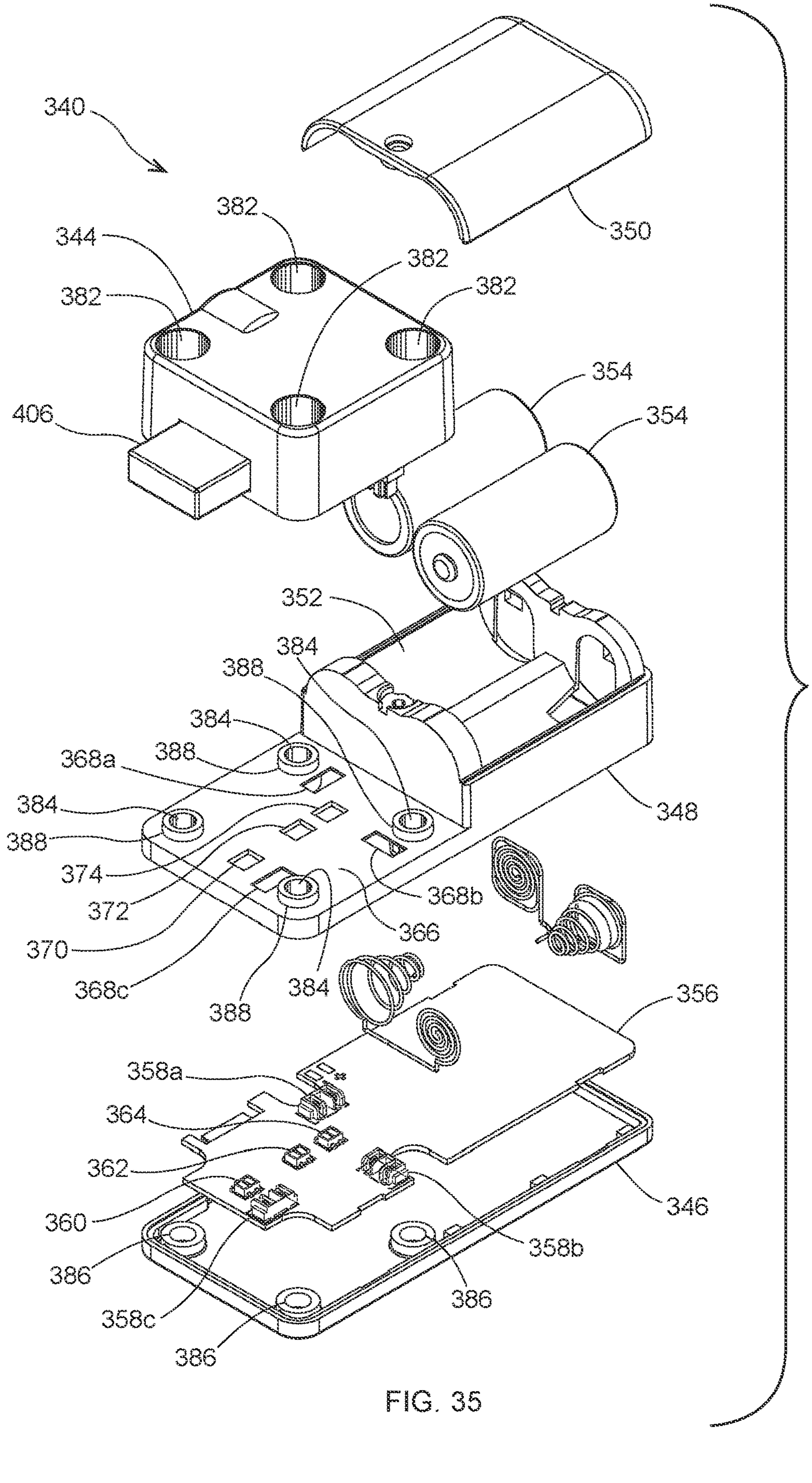
FIG. 35 is a perspective exploded view of the main housing of the lock of FIG. 34.

Disposed between the base 346 and the casing 348 is a circuit board 356. The circuit board 356 can include numerous of the same features as the circuit board 38 of the first embodiment. These features include a microprocessor, memory, a BLE chip, an RFID chip and antenna, and a capacitive sensor and chip, none of which are depicted in FIG. 34 or 35 for clarity. Also disposed on the circuit board 356 is a trio of receivers 358*a*, 358*b*, 358*c*, that are sized and shaped to transfer current and control signals to the lock housing 344. Each of the receivers 358*a*, 358*b*, 358*c* are in communication with the microprocessor. Finally, first proximity switch 360, second proximity switch 362, and third proximity switch 364 are also disposed on the circuit board 356. Again, the microprocessor is in communication with the switches 360, 362, 364. The casing 348 includes a receiver surface 366 that includes receiver access holes 368*a*, 368*b*, 368*c* and first, second, and third switch access holes 370, 372, and 374, respectively. As can be seen in both FIGS. 34 and 35, these access holes provide access through the receiver surface 366 to the receivers 358*a*, 358*b*, and 358*c* and switches 360, 362, and 364 mounted to the circuit board 356 beneath.

Figure 36:
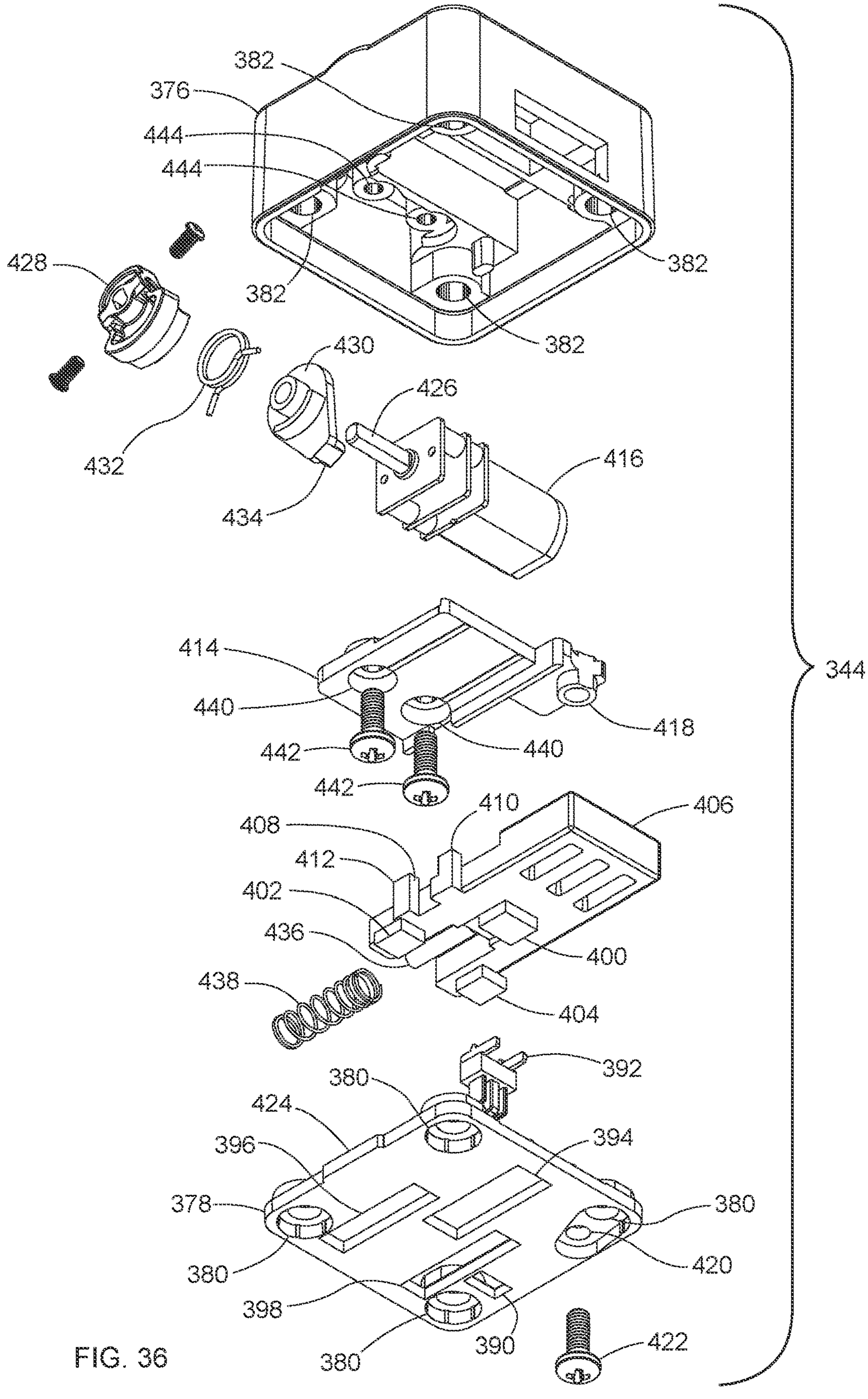
FIG. 36 is a perspective exploded view of the lock housing of the lock of FIG. 34.

Referring now to FIG. 36, an exploded view of the lock housing 344 from the bottom is depicted. The lock housing 344 includes an upper shell 376, a base plate 378, and a bolt 406 translatable within the housing 344 between a locked position and unlocked position as described with respect to the previous examples. The base plate 378 includes four corner mounting holes 380, and the upper shell includes four countersunk mounting holes 382 opposing the base plate 378 mounting holes 380. Likewise, as shown in FIG. 35, the casing 348 and the base 346 each include four mounting holes 384, 386 as well that are coaxial with the mounting holes 380, 382 of the casing 346 and the base 348. As described previously, the aforementioned sets of holes are used to mount the lock 340 to a panel with threaded fasteners such as screws. The casing 348 also includes locator cylinders 388 surrounding the four mounting holes 384 as in the previous examples which are used to locate and mount the lock housing 344 to the main housing 342 in any of three directions as in the previous embodiments.

Base plate 378 further includes a connector access hole 390 through which an electrical connector 392 extends. In this example, the connector 392 is sized and shaped to mate with the receivers 358*a*, 358*b*, 358*c*. Other configurations and structures for electrical connection will be seen by those of skill in the art. The connector 392 can contact and receive electrical power and control signals from any one of the receivers 358*a*, 358*b*, 358*c* depending on the orientation of the lock housing 344 relative to the main housing 342. The connector 392 can be press fit within the connector access hole 390 or otherwise secured to the base plate 378 by any means known in the art. One of ordinary skill will understand that the terms connector and receiver are used herein interchangeably and cover corresponding structures that are used to connect to transfer power and/or data.

The base plate 378 further includes three access slots 394, 396, 398, and the bolt 406 includes three proximity switch targets 400, 402, 404 that are disposed within the slots 394, 396, 398, respectively, and slide within the slots 394, 396, 398 as the bolt 406 translates between the locked position and the unlocked position. The targets 400, 402, 404 interact with the switches 360, 362, 364 to signal to the microprocessor the location of the bolt 406. In particular, the first target 400 will trigger the second switch 362 when the bolt 406 is in the unlocked position, regardless of the direction of the lock housing 344 relative to the main housing 342. When the lock housing 344 is in the position shown in FIG. 35, the first target 400 will trigger the first switch 360 while in the locked position. When the lock housing 344 is rotated to either the left or right direction as defined previously, either the second target 402 or the third target 404 will trigger the third switch 364 while in the locked position. The bolt 406 further includes a channel 408 defined by a front wall 410 and a back wall 412 that, as will be described later, aids in the translation of the bolt 406 between the locked and unlocked position.

The lock housing 344 further includes a motor support plate 414 to which an actuator 416 is mounted. Again, the disclosed actuator 416 includes an electric motor 416, but other known actuators can be used. The electric motor 416 is connected electrically via wiring (not shown) to the plug 392 and can receive power and control signals therefrom. The motor support plate 414 further includes a receiving hole 418, and the base plate includes a fifth through hole 420, such that the motor support plate 414 is mounted to the base plate 378 via a threaded fastener 422 with sufficient spacing therebetween so as to not interfere with motion of the bolt 406. The base plate 378 can further include a tab 424, and the upper shell 376 can include a recess (not shown) for the tab 424 to help secure the base plate 378 to the upper shell 376.

The lock housing 344 further includes a drive shaft 426 extending out from the electric motor 416, a motor cam 428, a cam driver 430, and a torsion spring 432 which are constructed and operate similarly to the same elements disclosed in FIG. 24. The cam driver 430 includes an arm 434 that is disposed within the channel 408 of the bolt 406. Rotation of the cam driver 430 in the counterclockwise direction, as seen in FIG. 36, will cause the arm 434 to bear against the front wall 410 of the channel 408, thereby pushing the bolt 406 forward and into the locked position. Rotation of the cam driver 430 in the clockwise direction will pull the bolt 406 rearwardly and into the unlocked position. The bolt 406 can further include a cylinder 436 and a coil spring 438 mounted on the cylinder 436 that will bias the bolt 406 to the locked position, thereby aiding the translation of the bolt 406. When the bolt 406 is in the locked position, the arm 434 bearing against the front wall 410 prevents any external force from pushing the bolt 406 back into the upper shell 376.

The motor support plate 414 can further include two slightly countersunk through holes 440 that allow for two threaded fasteners 442 to fasten the motor support plate 414 to complementary internal holes 444 within the upper shell 376. Accordingly, the base plate 378 is secured to the upper shell 376 via the tab 424 disposed in the receiver, the threaded fastener 422 between the base plate 378 and electric motor support plate 414, and the two threaded fasteners 442 between the electric motor support plate 414 and the upper shell 376.

Figure 37:
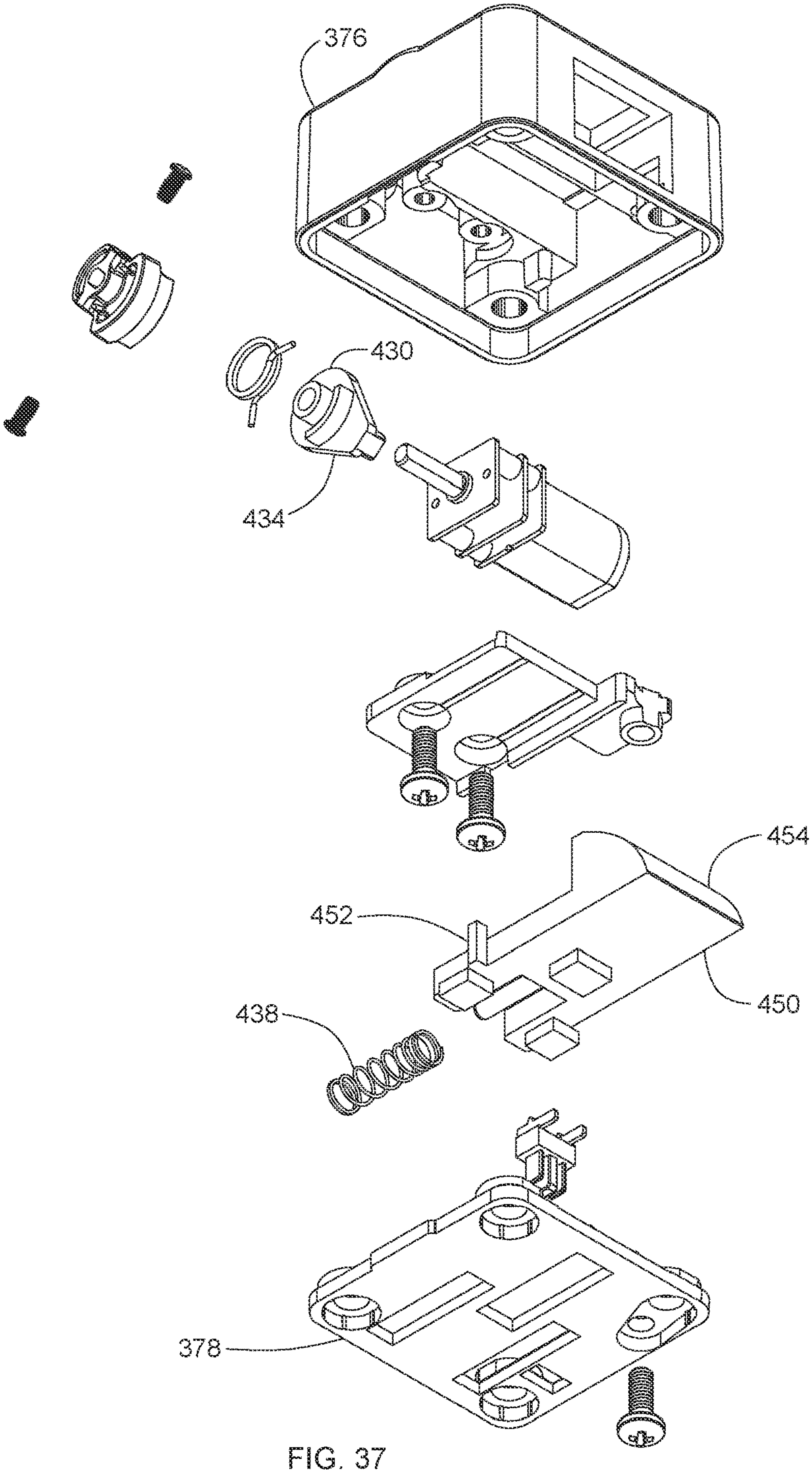
FIG. 37 is a perspective exploded view of a lock housing with a push-to-close latch of the lock of FIG. 34.

Another example using a push-to-close latch system is shown in FIG. 37. All elements of the embodiment shown in FIG. 37 are the same as shown in the embodiment shown in FIG. 36, and the same reference numerals are used, except for the latch 450. The latch 450 includes a follower 452 rather than the channel 408 disclosed in FIG. 36, and it further includes a ramp face 454. Accordingly, counterclockwise rotation of the cam driver 430 will cause the arm 434 to bear against the follower 452 and pull the latch 450 into the unlocked position. On the other hand, clockwise rotation of the cam driver 430 will cause the arm 434 to rotate away from the follower 452, and the coil spring 438 biases the ramp face 454 out of the upper shell 376 and to the locked position. External force on the ramp face 454 can push the latch 450 back to the unlocked position against the force of the coil spring 438, but when the external force is removed, the coil spring 438 biases the latch 450 back to the locked position, as is well known in the art.

The control of the opening and closing of the lock 10 will now be discussed. Note that while reference is made to the initial example of this disclosure, lock 10, the mechanisms and process of controlling lock 10 is also applicable to every example disclosed herein. The lock 10 is fully self-contained, compact, and can be constructed in multiple ways for an end user to open and close the lock 10. As disclosed above and as depicted in FIGS. 3 and 3A, the lock 10 is mounted to a wood door 26 and includes a wireless electronic access by which a user can provide his or her credentials. In this example, the electronic access is provided through either the internal RFID reader, i.e., the RFID antenna 54 and RFID chip 56, or the BLE chip 48, but other wireless communication devices, such as NFC, Bluetooth, or other RFID device, can be used. The user can present his or her credentials via, for example, Mobile ID or RFID tag, and the RFID, NFC, Bluetooth or BLE reader will read those credentials and pass that information on to the microprocessor 46. If those credentials match the credentials stored in the memory of lock 10, the microprocessor 46 can direct the electric motor 60 to retract the bolt 22 into the lock housing 14 to place the lock 10 in the unlocked position, or vice versa.

Figure 38:
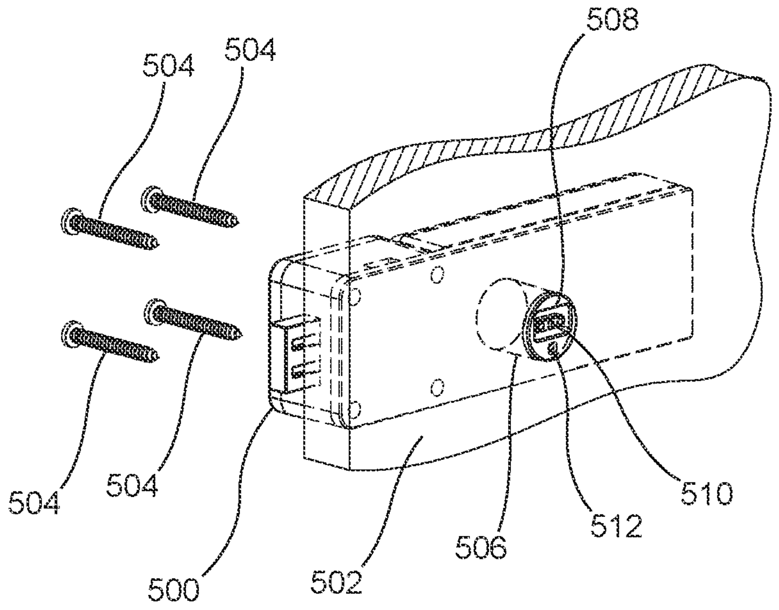
FIG. 38 is a perspective view of the lock of FIG. 1, including a user interface extending through an opening in the door or panel.

In other variations of communication with a user and methods of a user presenting credentials, FIG. 38 discloses a lock 500 mounted to a door 502 with screws 504. The lock 500 includes a user interface 506 in the form or a protuberance or boss that passes through a hole in the door 502 to expose a key slot 508 having three contact pins 510 and a lock status indicator 512 to the user. The lock status indicator 512 and the contact pins 510 of key slot 506 are connected to the main circuit board of the lock 500 to allow user to operate the lock 500 with an electronic key. The electronic key may have the structure and functionality as disclosed in U.S. Pat. Nos. 7,336,150 and 9,672,673, the disclosures of which are hereby incorporated by reference in full. The status indicator 512 can be an LED light showing different colors to indicate the different lock status of the lock 500. Of course, the user interface 506 can be in addition to the electronic wireless access described above.

Figure 39:
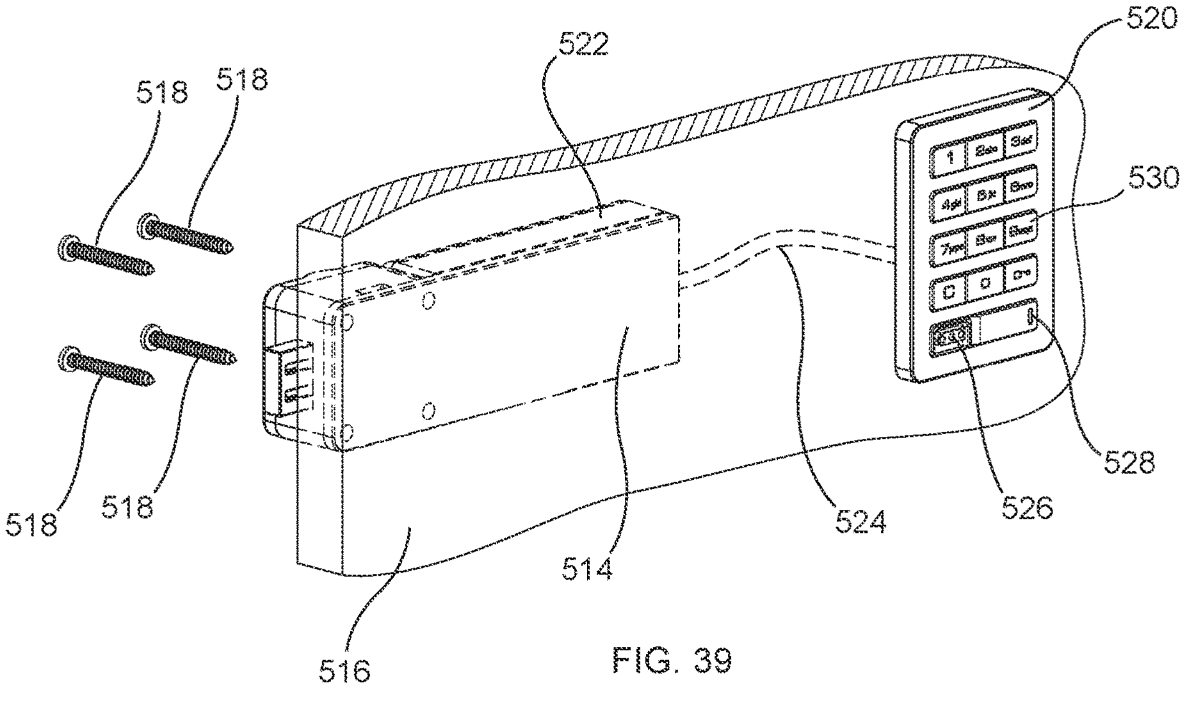
FIG. 39 is a perspective view of the lock of FIG. 1 with a key pad for receipt of credentials and a port for receipt of credentials via an electronic key.

FIG. 39 discloses a further example of a lock 514 mounted to a door 516 with screws 518. The lock 514 includes an external operation device 520 mounted to an exterior of the door 516 and connected to the main housing 522 via a cable 524. The external operation device 520 includes a key slot 526, a status indicator 528, and a keypad interface 530. The user can operate the lock 514 by entering a preselected code on the keypad interface 530, or inserting an electronic key to the key slot 526, or by wireless access.

Figure 40:
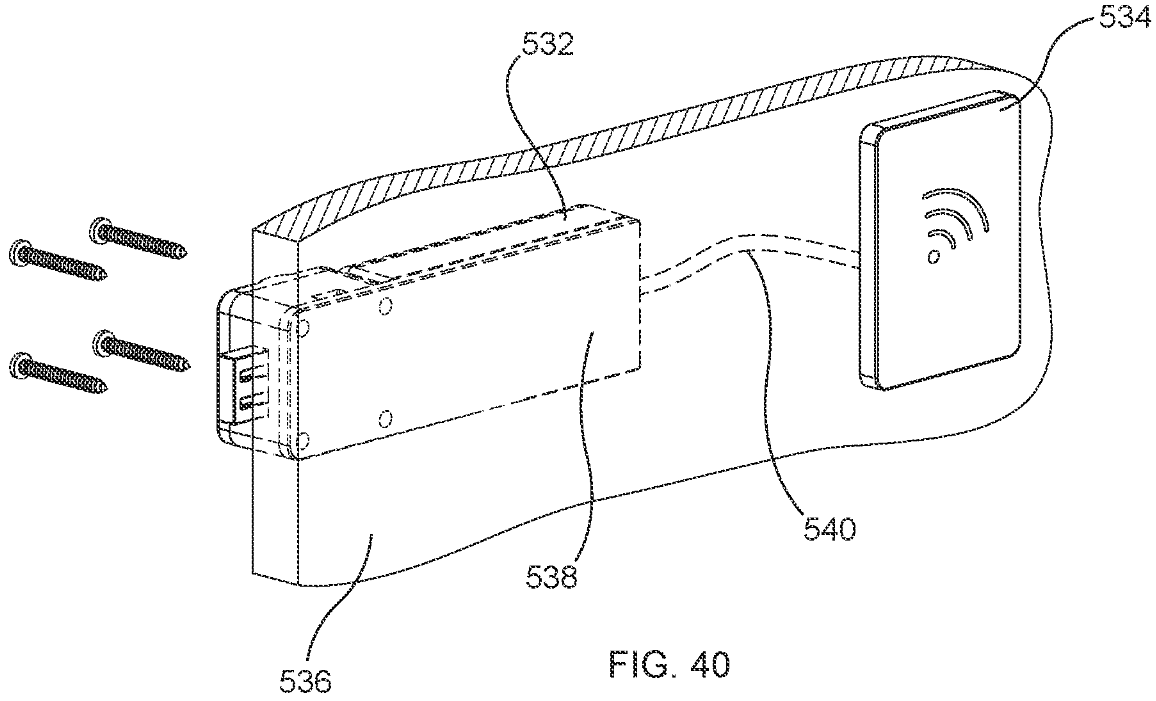
FIG. 40 is a perspective view of the lock of FIG. 1 with an RFID reader external to the door for receipt of credentials.
Figure 41:
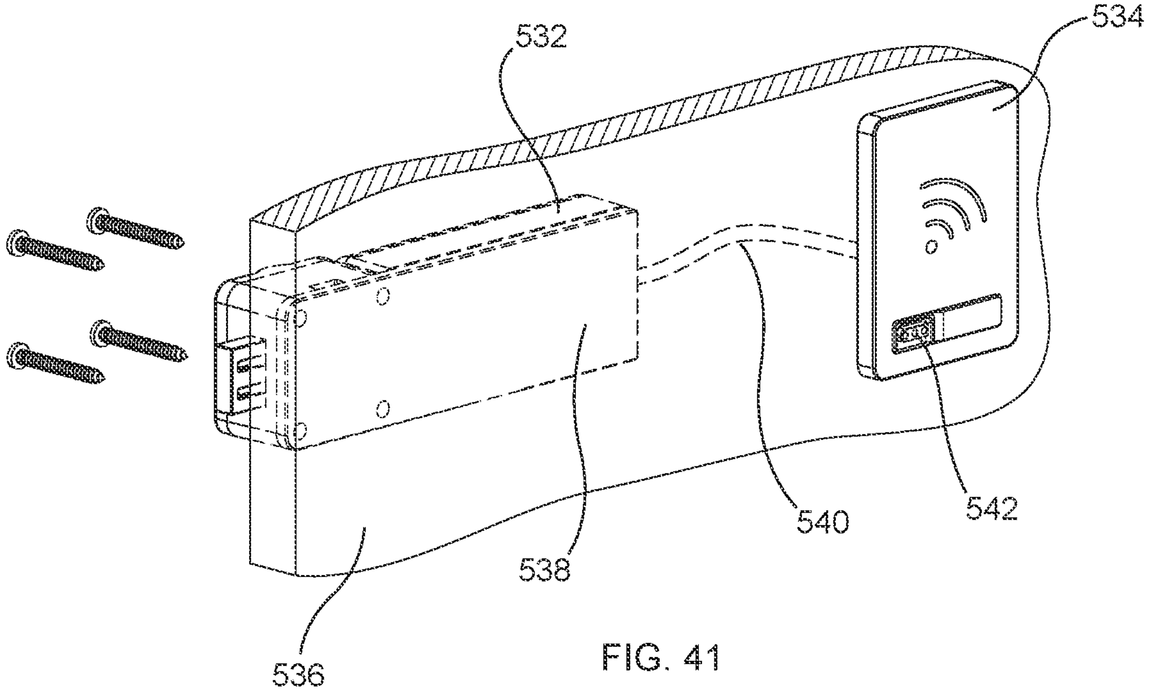
FIG. 41 is a perspective view of the lock of FIG. 1 with an RFID reader external to the door for receipt of credentials and a port for receipt of credentials via an electronic key.
Figure 42:
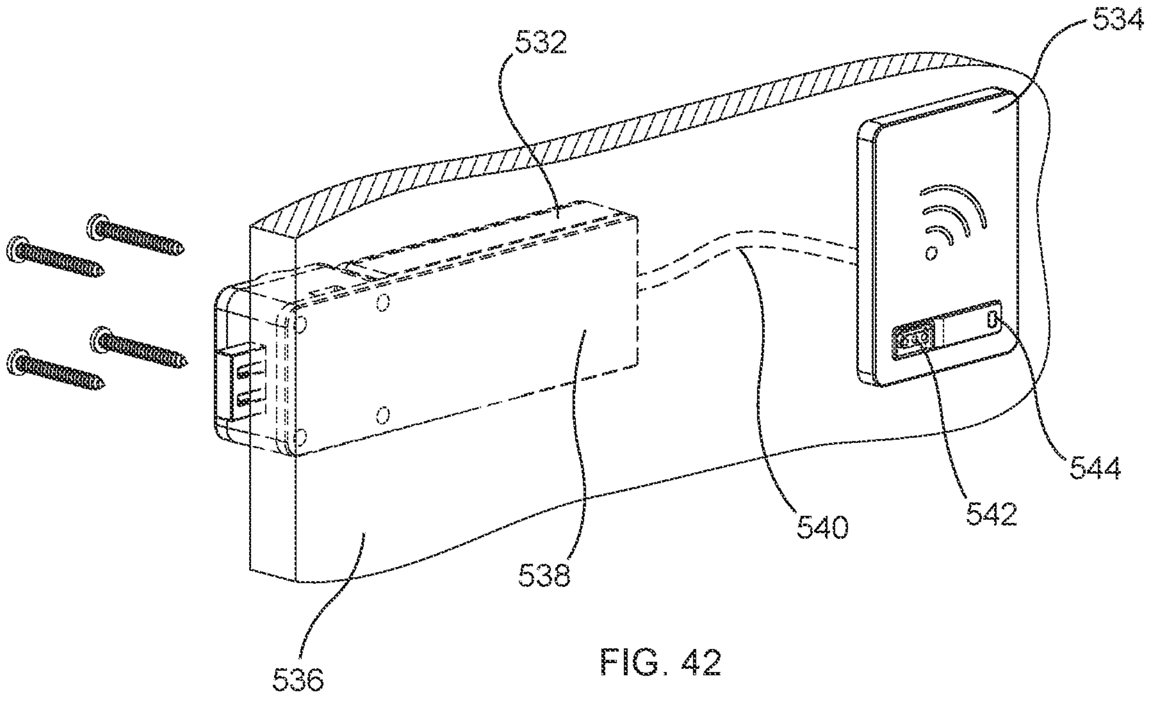
FIG. 42 is a perspective view of the lock of FIG. 1 with an RFID reader external to the door for receipt of credentials and a port for receipt of credentials via an electronic key as well as a status indicator.

FIGS. 40-42 depict further examples of locks with communication devices that are useful, for example, on metal cabinets. As is known, RFID, NFC, Bluetooth, and BLE signals have difficulty passing through metals, and therefore when the locking device is mounted to, for example, a metal cabinet, it may be necessary for the wireless communication device to reside outside of the cabinet. Accordingly, FIGS. 40-42 depict a lock 532 with an NFC reader 534 mounted to the outside of a cabinet 536 and connected to the main housing 538 via a cable 540. FIG. 41 depicts the NFC reader 534 with a port 542 for an electronic key, and FIG. 42 depicts the NFC reader 534 with a port 542 and a status indicator 544 as described above. The locks of FIGS. 38-42 can be constructed as described in any of the foregoing embodiments.

Figure 43:
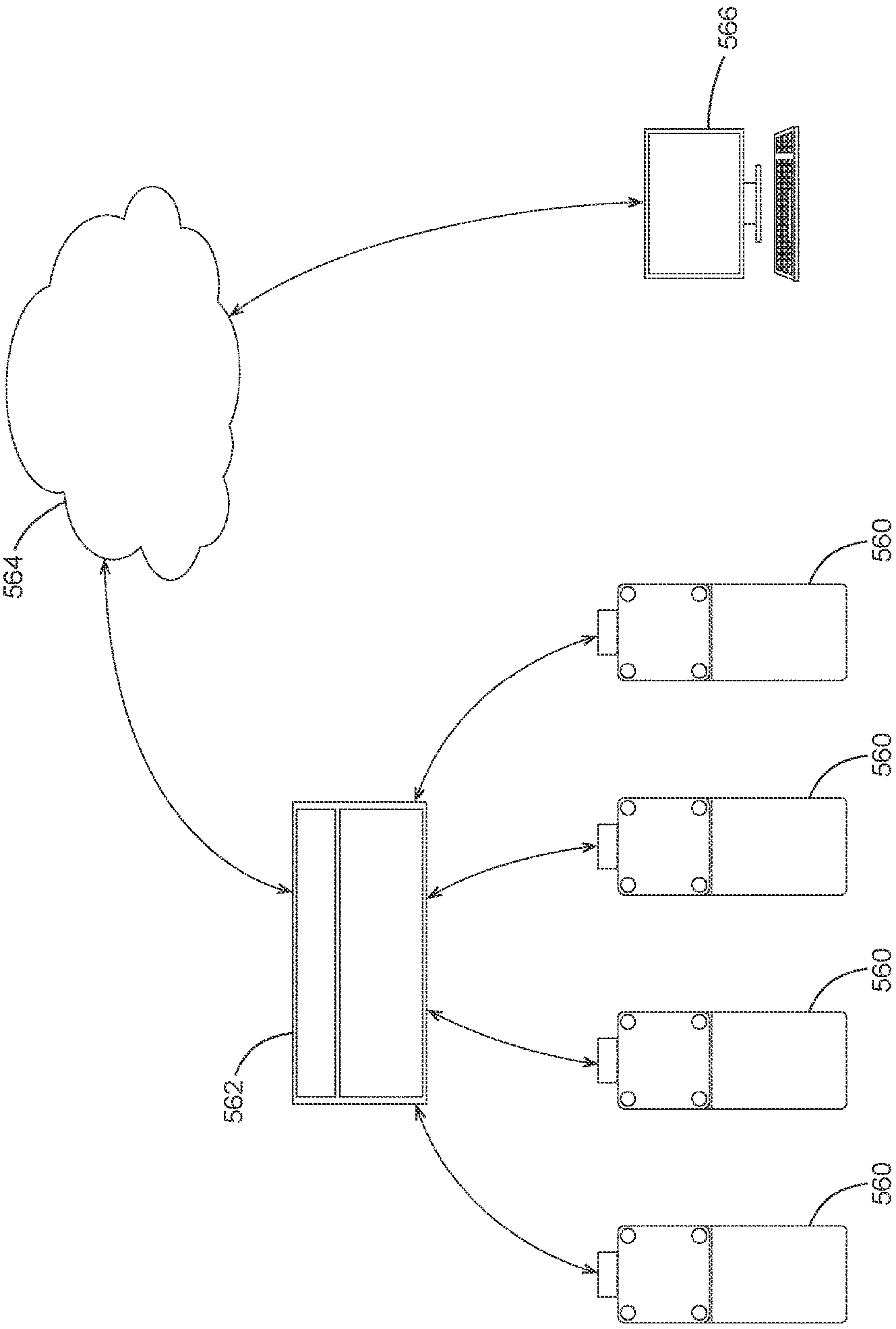
FIG. 43 is a block diagram of several locks connected to a personal computer through a cloud-based server.
Figure 44:
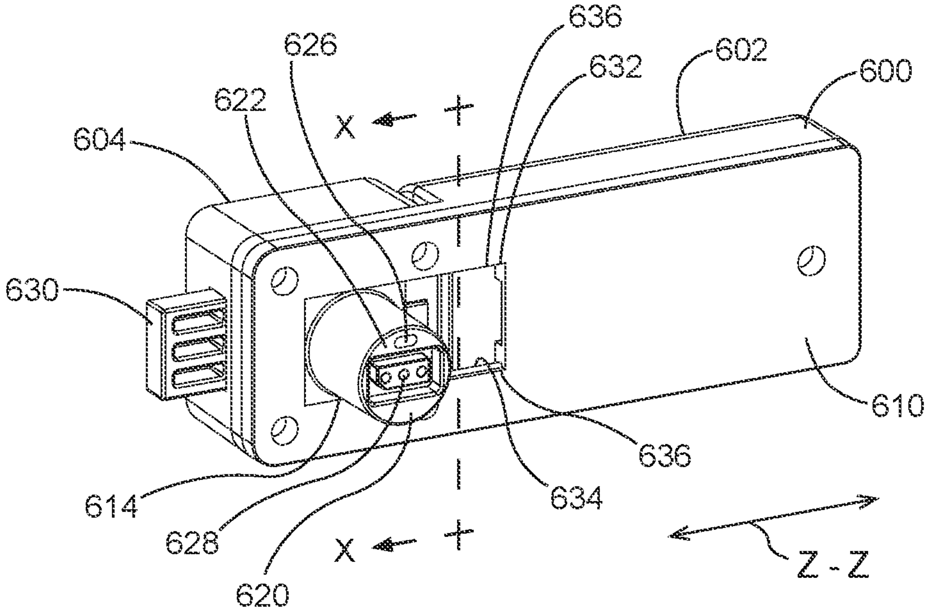
FIG. 44 is a perspective view of a lock, as in any of the examples above, with an adjustable user interface.

Referring now to FIG. 43, a system of locks 560 and their control is depicted. Again, the locks 560 can be, for example, constructed as described in any of the foregoing embodiments. As noted above, each lock 560 can include a BLE chip 48, and these BLE chips 48 can be configured to wirelessly receive credentials from users. Moreover, the BLE chips 48 can be configured to connect wirelessly to a remote controller 562 wirelessly. Although a BLE chip 48 is depicted and described herein, other structures and methods for wireless communication to the controller 562 are known in the art and can be implemented, such as WiFi or Bluetooth. Moreover, a fully wired connection to the controller 562 is possible. Finally, while the controller 562 is described as remote, it is remote in the sense that it is in communication with at least one other lock 560. It is conceivable that the functionality of the controller 562 may be integrated with a lock 560. The controller 562 should be disposed in a location that allows communication with the respective locks 560.

The controller 562 can set the credentials for each lock 560 that will allow operation of the lock 560 via the credential input as described above. The controller 562 can limit operability of the credentials by allowing operation at only certain times of day, by allowing certain users to operate some locks but not others, a combination of the foregoing, and so forth. The locks 560 can also be programmed to transmit information to the controller 562 regarding time and date of opening and closing of the lock, identification of the user in each instance, remaining battery power, and the like. In some examples, the lock 560 can include a sensor to determine if door 26 is open or closed. Such sensor can be magnetic, optical, or the like placed on the exterior of the main housing 12. In such configuration, this sensor can help determine forced entry of the door 26, i.e., the lock 560 remains in the locked position, but the door 26 is forced open. When a forced entry is detected, the lock 560 can signal the controller 562. The controller 562 can be connected to an audible alarm, which can be triggered upon receipt of a forced open signal.

The controller 562 can control further aspects to the functionality of the locks 560. Accordingly, the controller 562 can direct any of the locks 560 to shift between the locked position and the unlocked position by communicating with the microprocessors. In further functional aspects, the controller 562 can set one or more locks 560 in a locked position, but require no credentials to shift the locks 560 to an unlocked position. Instead, a user can open the locks 560 by simply activating the capacitive sensor 58. Thus, simply by placing his or her hand adjacent to a lock 560, the lock 560 will shift from the locked position to the unlocked position. Other functionality can be built into the system such as that described in U.S. Patent Publication No. 2018/0033227, the disclosure of which is incorporated by reference herein in full.

The controller 562 itself can be connected to a cloud-based server 564 via an internet connection. While only one controller 562, and one set of locks 560, is depicted in FIG. 43, it is understood that numerous controllers 562, each controlling several locks 560, can be connected to the cloud-based server 564. As is further depicted in FIG. 43, a personal computer 566 is connected to the cloud server 564 via the internet. While a personal computer 566 is depicted in FIG. 43, any computing device, such as a tablet or a smart phone, can also be used. Moreover, although a cloud-based server is disclosed, other servers such as on premise servers can also be used.

Here, a manager can control all functionality of the locks 560, including setting credentials for every lock 560 in the system, from any computer 566 connected to the internet. For example, via an application stored on the personal computer 566 or via a website, the user can communicate with the cloud-based server 564 to shift the locks 560 between the locked position and the unlocked position. The user can further update the credentials, and the cloud-based server 564 will communicate will, in turn, communicate with the controller 562. The controller 562 can then communicate with the predetermined individual locks 560 to set the credentials and functionality as described above, such as determining which user is authorized to open which of the locks 560, and at what times. Control of the locking devices may incorporate concepts disclosed in U.S. Pat. No. 9,672,673, which is incorporated in its entirety herein by reference. Moreover, the controllers 562 can communicate with the cloud-based server 564 to provide it with any of the lock statuses discussed above, and the user, using the personal computer 566, can review any and all of the data via the aforementioned websites or applications.

Again referring to lock 10, but noting that the following disclosures apply equally to all locks disclosed herein, lock 10 further contains several features that allow wireless operation while minimizing battery drain. These features allow the lock 10 to be powered solely by battery and achieve a long operating life, with no requirement of being connected to a wired power source. As described above, the lock 10 includes a proximity sensor, in this case a capacitive sensor 58, that can detect the presence of, for example, a human hand adjacent the lock 10 on the outside of the door via the interruption of a magnetic field. Other proximity sensors known in the art, such as photoelectric sensors, accelerometers, IR sensor, ultra-sound sensors, optical sensors, pressure sensors, eddy-current sensors, and the like can be used.

In a typical set-up, an electronic lock contains an active RFID reader, and the end user has a passive tag, i.e., a card, that maintains the user's credentials. The RFID reader continuously sends out interrogation signals to determine if a credentialed tag is nearby. If so, the interrogation signals further provide the energy for any tag in the vicinity. The tag receives the energy from the active reader and responds with the identification information.

As disclosed herein, however, the capacitive sensor 58 can minimize power consumption and allow for a fully contained lock 10 without need of an outside, continuous power source. In the disclosed embodiment, the lock 10 is typically in a low-power sleep mode, where the microprocessor 46 prevents the RFID reader from emitting interrogation signals. Instead, only the capacitive sensor 58 is active. Once an end user places his or her hand adjacent the lock 10, the magnetic field generated by the capacitive sensor 58 is disrupted. The capacitive sensor 58 is thereby actuated and signals the microprocessor 46, and the microprocessor 46 directs the RFID reader to begin emitting interrogating signals. The user's RFID tag then identifies itself, and, as usual, the RFID antenna 54 receives the identification, and the microprocessor 46 determines if the user has the proper credentials.

In a further aspect reducing power consumption, upon actuation of the capacitive sensor 58, the microprocessor 46 of the lock 560 can initiate an interrogation of the controller 562 for any updates to the credentials of authorized tags. Upon receipt of the updated list of credentials (or lack of updates), the microprocessor 46 will authorize (or will not authorize) the opening of the lock 560. Such information can be downloaded from the controller 562 to the lock 560 near instantaneously, occurring fully in the background, and an end user is not aware of the data transfer. Further, by limiting updates to the list of credentials to only the times that the capacitive sensor 58 is actuated, communications between the locks 560 and the controller 562 are minimized, rather than having constant polling by the locks 560 or multiple pushes from the controller 562 to the locks 560.

Use of the capacitive sensor 58 in any of these manners can significantly cut power consumption of the system, and therefore significantly increase the lifetime of the lock 10 before battery replacement is necessary.

In the system disclosed in FIG. 43, power consumption can be further reduced. As discussed above, a manager can control operation of the locks 560 by way of the personal computer 566. In particular, the manager can control the capacitive sensors 58 of the locks 560. Thus, the capacitive sensors 58 themselves can be limited to only be operable at certain times of day or certain days of the week. Further, it may be desirable for certain locks 560 to only be operable when specifically OK'd by a manager. In this instance, the capacitive sensor 58 can be inoperable unless and until a manager directs the capacitive sensor 58 to be operable by a command at the personal computer 566. Only then will an end user's hand near the lock 560 activate the capacitive sensor 58 and allow the RFID reader to become active.

Referring now to FIGS. 44-48, a lock 600 is disclosed with a main housing 602 and a lock housing 604. The lock 600 can be, generally speaking, a modified version of the lock 500 of FIG. 38. The lock 600 is configured to mount to a door or panel 606 (see FIGS. 47, 48) with a thickness generally corresponding to a wood panel 606, the panel 606 having a through hole 608, similar to the panel 502 disclosed in FIG. 38. The lock 600 includes a base plate 610 that, when mounted, is in planar contact with an interior side 612 of the panel 606. The lock 600 includes a user interface 614, similar to the shape and size of the user interface 506 of FIG. 38, that is sized and shaped for insertion into the through hole 608, although the user interface 614 may also be slightly frusto-conical to ease its insertion into the through hole 608.

The user interface 614 may include a distal surface 620 on which a user terminal 622 is disposed. The user terminal 622 is connected to a circuit board 616 via flexible wiring 618. The height of the user interface 614 may be sized such that the distal surface 620 is generally co-planar with an exterior surface 624 of the panel 606. The user terminal 622 can include a visual indicator 626 such as an LED, as described above with respect to the indicator 512 in FIG. 38. The indicator 626, in one example, can visually indicate to a user the lock status. The indicator 626 may, for example, emit green light when the lock 600 is open and red light when the lock 600 is closed. It may also flash red and green lights at intervals to save battery power. The indicator 626 may further provide a visual indication of low battery power, such as a flashing blue light. The indicator 626 may provide other visual indications, such as programming status, improper access codes, and the like. Of course, other colors and patterns can be used.

In an alternative example, the user interface 614 can include an opening, and the indicator 626 can be a disk or chip that has a two-colored face—e.g., the indicator can have green section and a red section—disposed directly behind the opening. The indicator 626 can be coupled to an actuator such as a keep actuator, and only one section is visible through the opening to the user at a time. Depending on the lock status, the actuator can shift the position of the indicator 626 such that either the green section is visible, thereby indicting that the lock is unlocked, or the red section is visible. The keep actuator maintains the position of the indicator 626 without consuming any further power. The alternative example has the added benefit that it does not require any battery power except for shifting the indicator 626 between positions.

The user terminal 622 can further include a connector 628, with structure and function as described above with respect to the key slot 508 in FIG. 38, and is connected to the lock's microprocessor 46. The connector 628 can function as a connector for data and power. In one example, the connector 628 can receive a key that can provide jump power to a lock 600 that is in a low-battery power state. In another example, the connector 628 can connect a key that provides an access code that operates the lock 600, i.e., opens and closes the lock 600. The connector 628 can further receive a manager's key that can set or re-set the access codes. The manager's key may also download from the lock 600 an audit trail of uses of the lock 600, including user names, date, and time of usage. Of course, the lock 600 can also include a wireless reader for reading, for example Bluetooth, BLE, RFID, or NFC signals that provide the access code as described above.

The connector 628 can further take the form of any electrical connector, including those capable of transmitting power and data, such as USB-type connectors and Lightning connectors for Apple® products. In such a scenario, a user could connect his or her personal computer or mobile computer, such as a smart phone or tablet, directly to the lock 600 to program the lock 600, operate the lock 600, or download the audit trail or other information.

The exemplary locks 500 and 600 are well-suited to replace a standard mechanical cam lock typically installed on a cabinet or drawer. A cam lock is mounted through a hole in a panel. Typically, a key can be inserted into the cam lock from the exterior side of the panel, and the cam, or other locking element, can be rotated to and from locking positions on the interior of the panel via rotation of the key. When the cam lock is removed, the panel's hole is exposed. The user interface 506 of the lock 500 and the user interface 614 of the lock 600 can be sized and shaped to be inserted into the hole in the panel left behind by the cam lock when the cam lock is removed. Of course, for panels that do not have a cam lock to be removed, a manufacturer or user can drill out a hole in the door panel to receive the user interface 506, 614 when mounting the lock 500 or lock 600 to the panel.

The user interface 614 of the lock 600 may further be adjustable laterally along axis Z-Z to account for differences in the backset of the cam lock hole relative to edge of the panel. Cam locks installed by a furniture manufacturer may have differing lengths of cam blades, and may be located in a panel with differing lengths to the panel's edge—i.e., the backset. Accordingly, the backset of the user interface 614 of the lock 600 may be adjustable to account for these differences in the location of the hole in the panel 606 so that a locking element 630 of the lock 600 can secure the panel 606 in a closed position when the bolt is extended. Moreover, when the locking element 630 is retracted, the panel 606 can open and the housing 602 will not interfere with the opening and closing.

Figure 45:
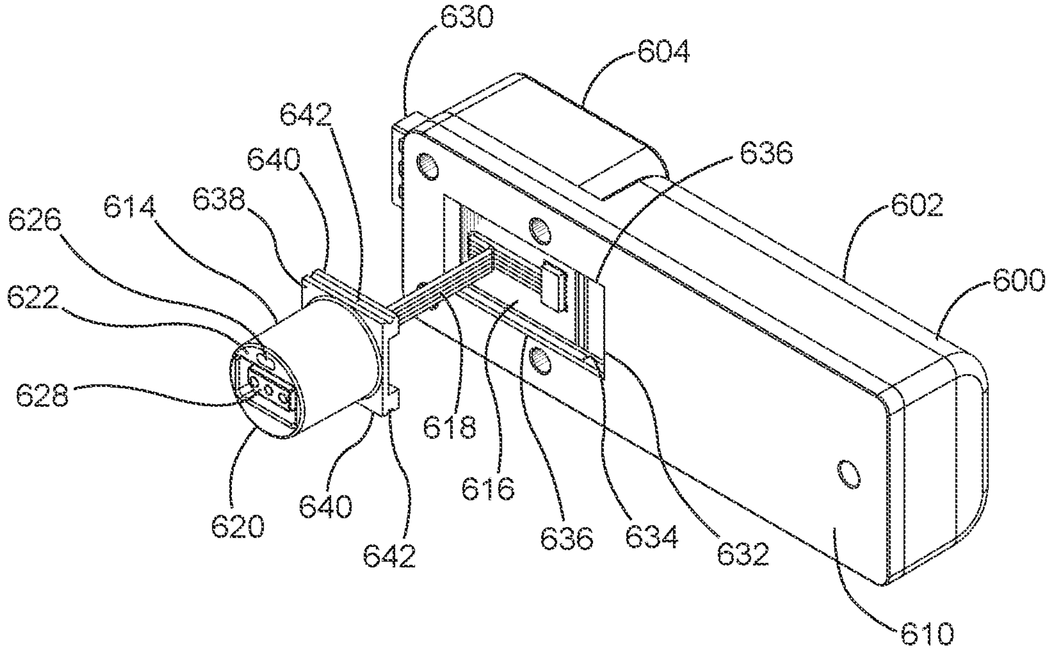
FIG. 45 is an exploded perspective view of the lock of FIG. 44.
Figure 46:
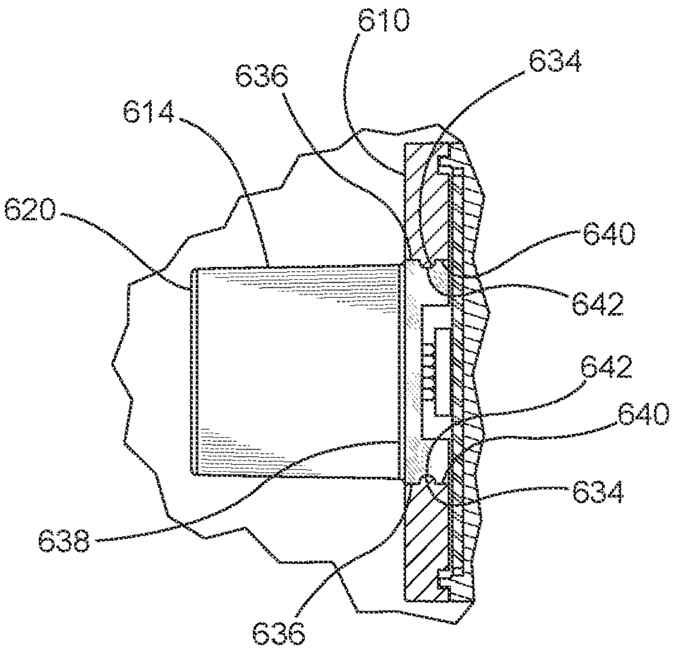
FIG. 46 is a section view of the lock of FIG. 44, taken along line X-X in FIG. 44.
Figure 47:
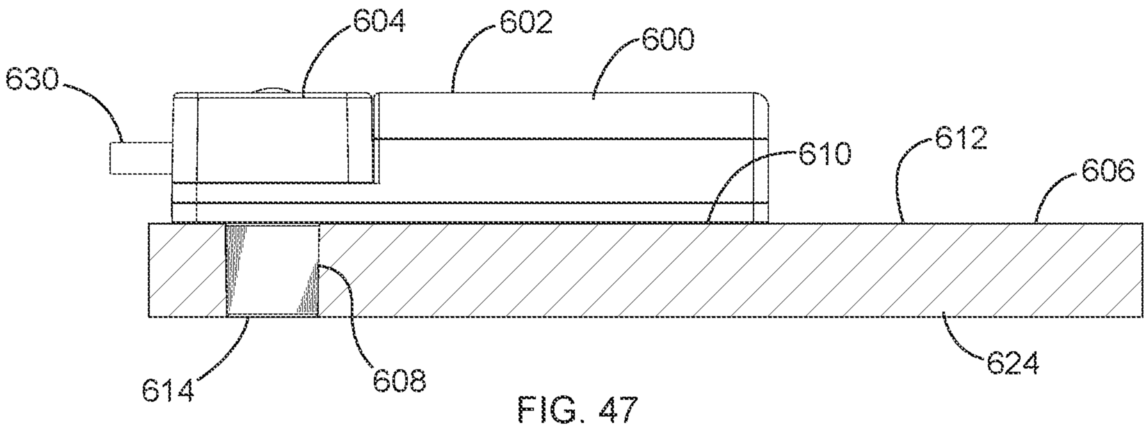
FIG. 47 is a side view of the lock of FIG. 44 in a first position, with a section view of the panel to which it is mounted.
Figure 48:
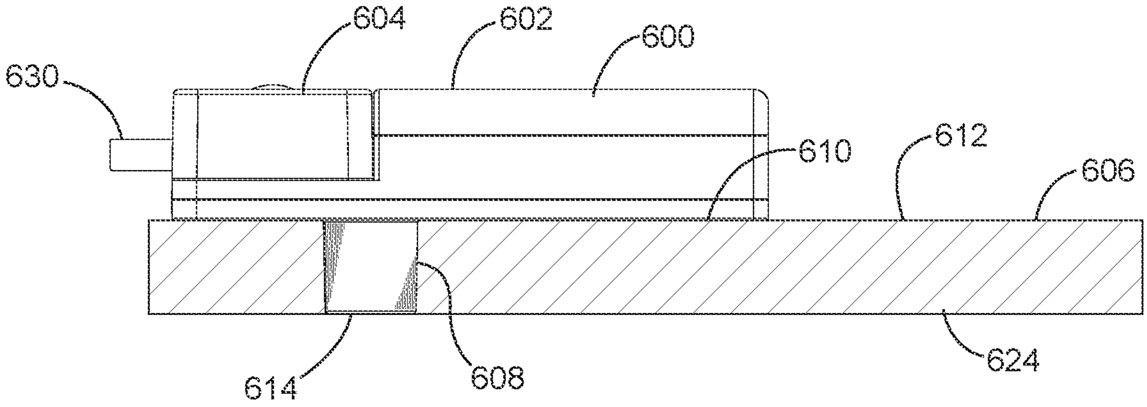
FIG. 48 is a side view of the lock of FIG. 44 in a second position, with a section view of the panel to which it is mounted.

The base plate 610 of the lock 600 includes an opening 632 in which the user interface 614 can be disposed. As best seen in FIGS. 45 & 46, side rails 634 are disposed along top and bottom edges 636 of the opening 632. Further, the user interface 614 is disposed on a mounting plate 638 having top and bottom edges 640. Each edge 640 includes transverse recesses 642 that are complementary to the side rails 634. When the mounting plate 638 of the user interface 614 is disposed in the opening 632 of the base plate 604, and the transverse recesses 642 are disposed on the side rails 634, the user interface 614 is slidable along axis Z-Z relative to the base plate 610. Thus, as depicted in FIGS. 47 and 48, the user interface 614 can be disposed in the hole 608 in the panel 606, and the lock 600 can then be slid in either direction of axis Z-Z to the appropriate location and affixed to the panel 606 to adjust to backset of the lock 600.

Figure 51:
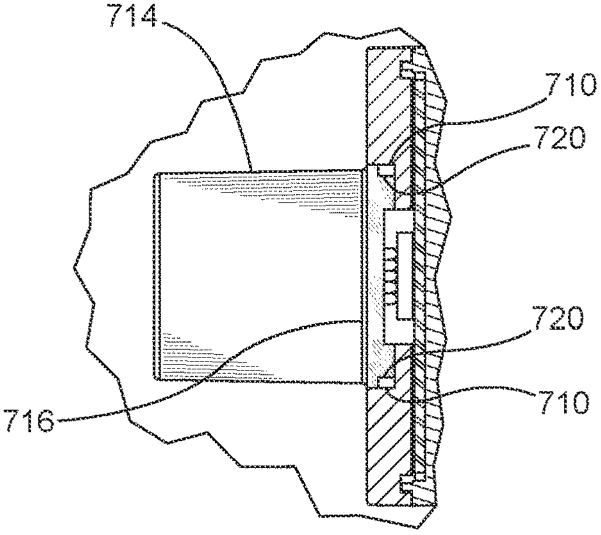
FIG. 51 is a section view of the lock of FIG. 49, taken along section line Y-Y in FIG. 49.
Figure 49:
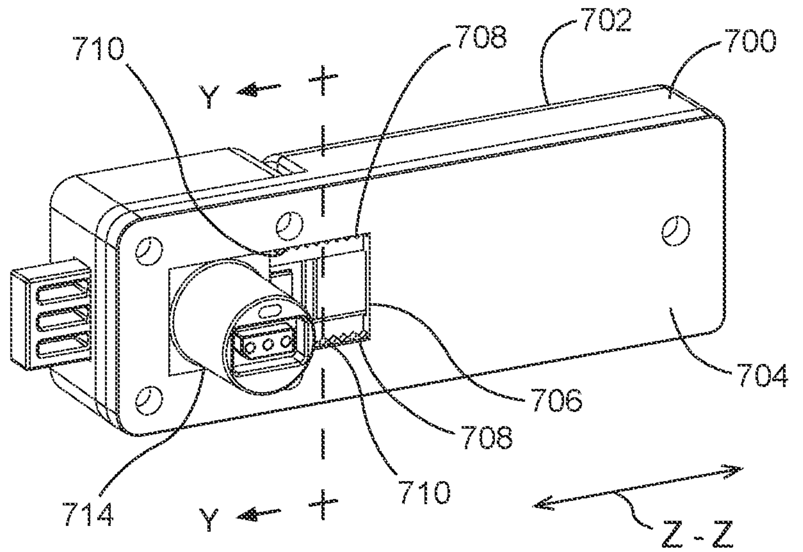
FIG. 49 is a perspective view of a lock, as in any of the examples above, including a second example of an adjustable user interface.
Figure 50:
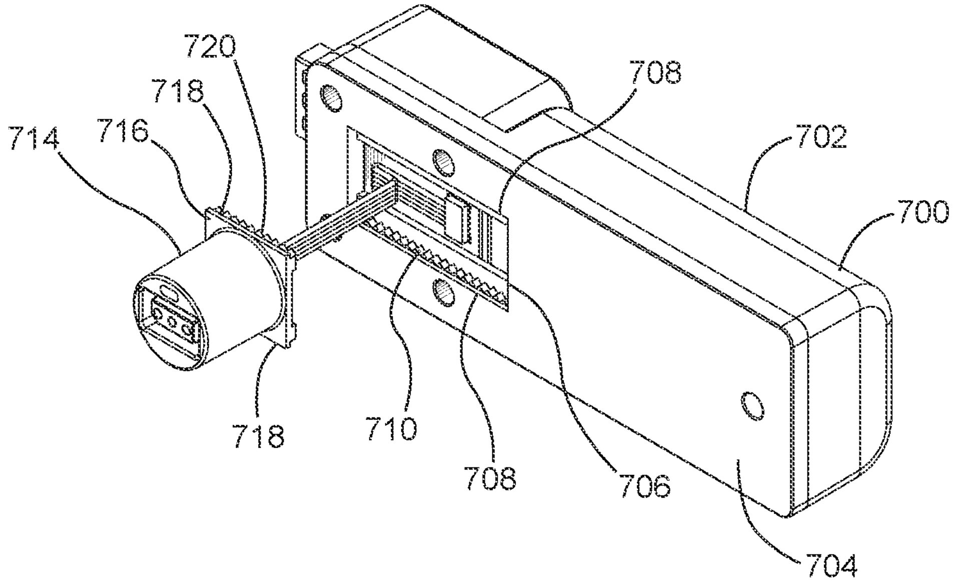
FIG. 50 is an exploded perspective view of the lock of FIG. 49.

In a second example of a lock with a user interface having an adjustable location, a lock 700 is disclosed in FIGS. 49, 50, and 51. As in the previous example, the lock 700 has a main housing 702 with a base plate 704. The base plate 704 has an opening 706 with top and bottom edges 708. The top and bottom edges 708 have a zig-zag profile, the zig-zags defining a plurality of receptacles 710. And again as in the previous example, the lock 700 includes a user interface 714 having a mounting plate 716. In this example, the mounting plate 716 has top and bottom edge 718, with each edge 718 having a zig-zag profile defining a plurality of teeth 720.

The zig-zag profile of the mounting plate 716 is complementary to the zig-zag profile of the opening 706 such that the user interface 714 can be placed into the opening 706, with the teeth 720 being set in and engaging the receptacles 710. Once the teeth 720 are set in the receptacles 710, the user interface 714 is prevented from lateral movement in either direction defined by axis Z-Z relative to the base plate 704. The user interface 714 can further be lifted out of the opening 706 and placed back in the opening 706 at a different location along the axis Z-Z in any one of the plurality of discrete locations defined by the interaction of the receptacles 710 and teeth 720. The teeth 720 can be an interference or snap fit into the receptacles 710, or the teeth 720 can slide into the receptacles 710 without a positive retention structure. Other structures that allow adjustment of the user interface 614, 714 along axis Z-Z relative to the base plate 610, 704 may be employed, such as affixing the user interface 714 to the housing 702 using fasteners or adhesives, rack and pinion gearing to adjust the backset, disconnecting the user interface 614, 714 from the back plate 610, 704, and so forth.

In a further example, the height of any of the user interfaces described above can be adjustable. For example, and referring to user interface 614 for convenience only, the user interface 614 can be constructed such that distance of the distal surface 620 relative to the base plate 610 is adjustable to account for doors or panels 606 of differing thicknesses. Multiple different structural designs can be employed to achieve these ends. For example, the user interface 614 could be constructed as two pieces slidable relative to one another, with multiple detents for affixing the height. The user interface could be constructed as multiple pieces, including an externally threaded rotatable collar and an internally threaded post, such that one piece rotated about the other can extend or contract the height (not unlike a jack screw). Other designs and configurations will be apparent to those of skill in the art.

Figure 52:
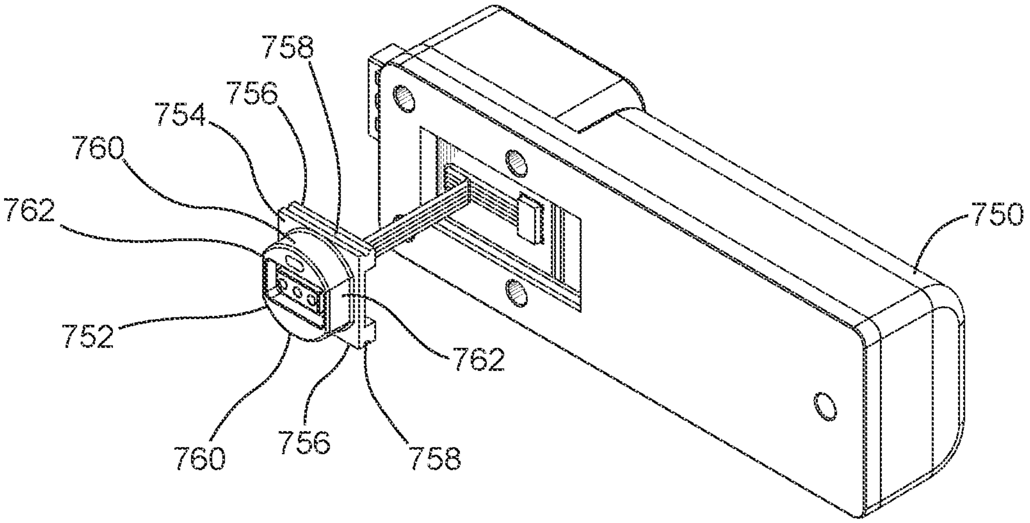
FIG. 52 is a perspective view of a lock, as in any of the examples above, including a third example of an adjustable user interface.

In another example, the lock with a user interface can be configured to be mounted to a door or panel made of sheet metal. Referring now to FIG. 52, a lock 750 is disclosed with a user interface 752. Sheet metal panels are generally much thinner than wood panels—such as the panel 606 disclosed in FIGS. 47 and 48—and accordingly the user interface 752 can have a height that is shorter than the height of user interfaces 614, 714. Otherwise, the user interface 752 can be constructed in the same manner as either user interface 614 or user interface 714 or any of the alternative embodiments discussed above. In particular, as disclosed in FIG. 52, the user interface 752 includes a mounting plate 754 with top and bottom edges 756 having transverse recesses 758, similar to the user interface 614. Of course, the mounting plate 754 of user interface 752 can be constructed as discussed in other embodiments herein.

The user interface 752 can have a "double-D" configuration. It is common for the through-holes in sheet metal panels for cam locks to be in the shape of either a 'single-D' or 'double-D.' A 'double-D' hole is generally in the shape of a circle on top and bottom, but has straight vertical edges on either side. A 'single-D' hole is likewise in the shape of a circle but has a single straight vertical edge on one side. The straight edges assist in preventing the cam lock from rotating within the hole when the user turns the key to operate the lock (which puts a rotational force on the lock). As is shown in FIG. 52, the user interface 752 has a shape that is complementary to a double-D opening in a sheet metal panel or door. In other words, the cross section of the user interface 752 has circular sections 760 on top and bottom with straight vertical edges 762 on the sides. It is also commonplace and well-known to include a framing ring either around the opening in the panel or around the user interface 752 to finish the design.

In the examples of FIGS. 38 and 44-52, the locks 500, 600, 700, and 750 affixed to the interior side of the door or panel, with the user interface 506, 614, 714, 752 extending through the door or panel, may take alternate forms or structures. For example, lock 600 discloses a locking element 630 in the form of a bolt, but other locking elements, such as a cam or latch, can be employed. Accordingly, the lock mounted to the interior of the panel with the user interface extending through a hole in the panel is not limited to any form or structure of locking element 630. Moreover, in another example, the locks 500, 600, 700, 750 may comprise a single housing, with all components housed in the single housing, rather than separate main housings and lock housings. Further, the locking element may only operable in a single direction. Of course, the user interfaces 506, 614, 714, 752 can be included on any of the multi-directional locks disclosed herein as well.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. A convertible, multi-directional lock for a door, cabinet, panel, or drawer in a cabinet, locker, furniture, or other storage device, the lock comprising:

a main housing;

a circuit board disposed within the main housing;

a microprocessor disposed on the circuit board;

a first proximity switch and a second proximity switch disposed in the main housing and in communication with the microprocessor;

a lock housing mountable to the main housing, wherein the lock housing is selectively mountable to the main housing in at least two orientations;

a locking element disposed in the lock housing and configured to translate between a locked position and an unlocked position;

a first target carried by the locking element, the first target configured to trigger the first proximity switch when the locking element is in the locked position, and the first target is configured to trigger the second proximity switch when the locking element is in the unlocked position.

2. The lock of claim 1, the lock further comprising a third proximity switch disposed in the main housing and in communication with the microprocessor, the locking element further including second and third targets, wherein the lock housing is selectively mountable to the main housing in at least three orientations, wherein lock is configured such that one of the targets triggers one of the proximity switches when the locking element is in either the locked position or in the unlocked position in any of three orientations of the lock housing relative to the main housing.

3. The lock of claim 2, the lock housing including first, second, and third slots through which the first, second, and third targets slide.

4. The lock of claim 1, the locking element comprising a latch or a deadbolt.

5. The lock of claim 1, wherein the locking element is configured translate linearly.

6. The lock of claim 1, further comprising means for translating the locking element.

7. The lock of claim 6, wherein the means for translating the locking element is disposed in the lock housing.

8. The lock of claim 6, wherein the means for translating the locking element comprises an actuator.

9. The lock of claim 8, wherein the actuator is an electric motor or a solenoid.

10. The lock of claim 8, wherein the actuator is disposed in the lock housing.

11. The lock of claim 1, further comprising a wireless reader configured to receive lock credentials.

12. The lock of claim 11, wherein the wireless reader is configured to read one or more of NFC, Bluetooth, BLE, or RFID signals.

13. The lock of claim 11, further comprising a capacitive sensor, wherein the processor is configured to activate the wireless reader upon actuation of the capacitive sensor.

14. The lock of claim 13, wherein the capacitive sensor is disposed within the main housing.

15. The lock of claim 1, further comprising a wireless reader configured to be connected to the internet.

16. The lock of claim 1, the main housing further including a battery compartment configured to hold one or more batteries.

* * * * *